(12) United States Patent
So et al.

(10) Patent No.: US 12,249,264 B2
(45) Date of Patent: Mar. 11, 2025

(54) DISPLAY DEVICE

(71) Applicant: SAMSUNG DISPLAY CO., LTD., Yongin-si (KR)

(72) Inventors: Yongsub So, Yongin-si (KR); Keumdong Jung, Yongin-si (KR); Sanghun Park, Yongin-si (KR); Da Eun Yi, Yongin-si (KR); Bo-Hwan Lee, Yongin-si (KR); Byeongkyu Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/446,195

(22) Filed: Aug. 8, 2023

(65) Prior Publication Data
US 2024/0119877 A1    Apr. 11, 2024

(30) Foreign Application Priority Data

Oct. 11, 2022 (KR) .......... 10-2022-0129548
Jan. 3, 2023 (KR) .......... 10-2023-0000488

(51) Int. Cl.
*G09G 3/02* (2006.01)

(52) U.S. Cl.
CPC ..... *G09G 3/025* (2013.01); *G09G 2300/0804* (2013.01); *G09G 2310/021* (2013.01); *G09G 2310/0213* (2013.01); *G09G 2310/08* (2013.01); *G09G 2360/12* (2013.01); *G09G 2370/22* (2013.01)

(58) Field of Classification Search
CPC ......... G06F 3/041–048; G06F 3/03545–03546
See application file for complete search history.

(56) References Cited

U.S. PATENT DOCUMENTS

| | | | |
|---|---|---|---|
| 8,884,917 B2 | 11/2014 | Seo | |
| 11,262,861 B2 | 3/2022 | Park et al. | |
| 11,416,100 B2 | 8/2022 | Lim | |
| 2022/0019332 A1* | 1/2022 | Ko | G06F 1/3206 |
| 2023/0004274 A1* | 1/2023 | Shin | G06F 3/0418 |

FOREIGN PATENT DOCUMENTS

| | | |
|---|---|---|
| KR | 10-1747731 | 6/2017 |
| KR | 10-2021-0054111 | 5/2021 |
| KR | 10-2022-0058712 | 5/2022 |

* cited by examiner

*Primary Examiner* — Hang Lin
(74) *Attorney, Agent, or Firm* — F. Chau & Associates, LLC

(57) ABSTRACT

A display device includes a display panel, an input sensor disposed on the display panel and sensing an input during a sensing frame period, a display controller receiving a vertical synchronization signal and a horizontal synchronization signal and controlling driving of the display panel in response to the vertical synchronization signal and the horizontal synchronization signal, and a sensor controller providing a transmission signal including a plurality of sampling periods to the input sensor. The display controller provides frequency information of a display frame period to the sensor controller using at least one of the vertical synchronization signal and the horizontal synchronization signal, and the sensor controller controls the number of the sampling periods of the sensing frame period based on the frequency information.

25 Claims, 20 Drawing Sheets

FIG. 3A
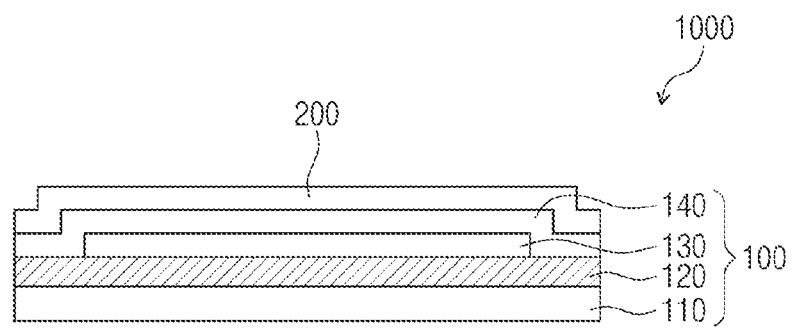
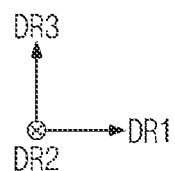
FIG. 3B
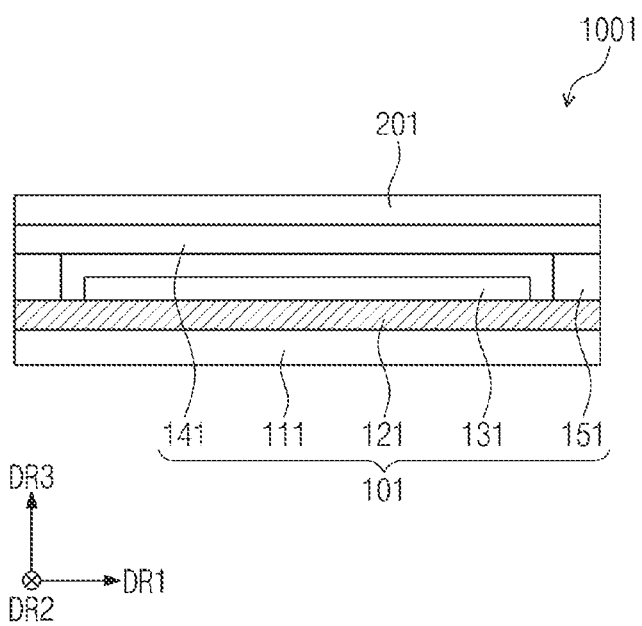
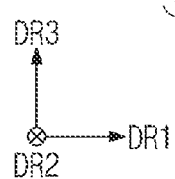

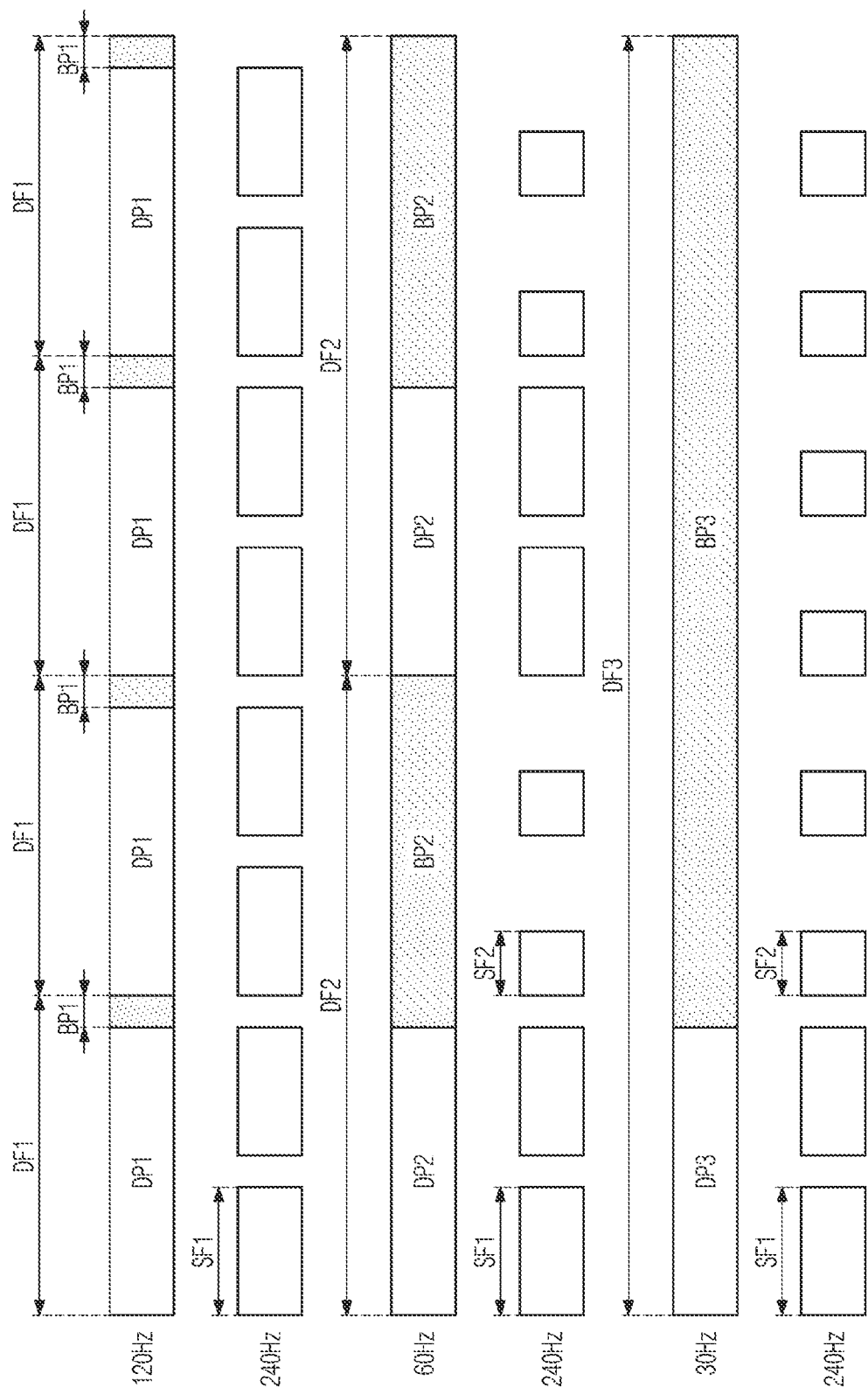

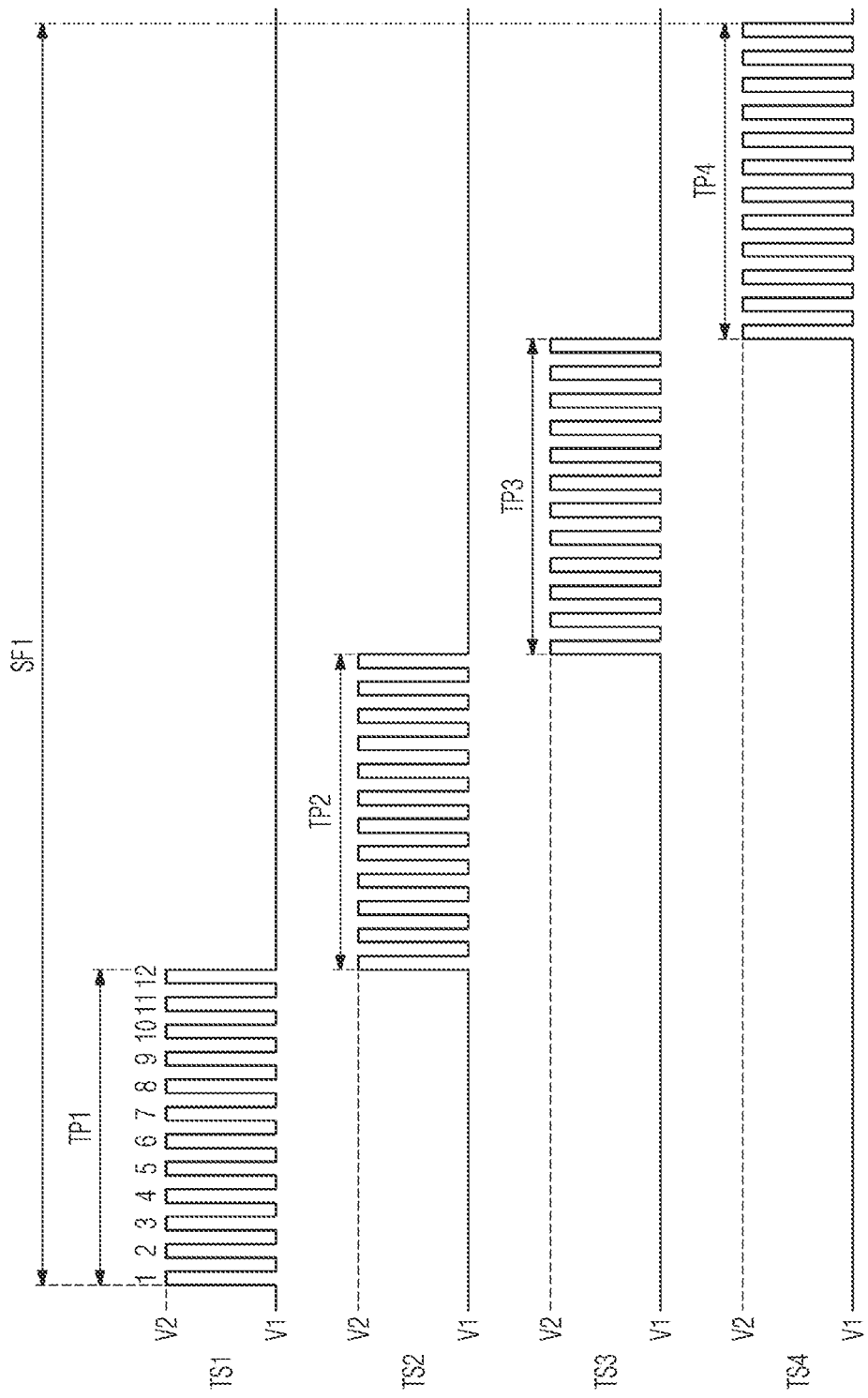

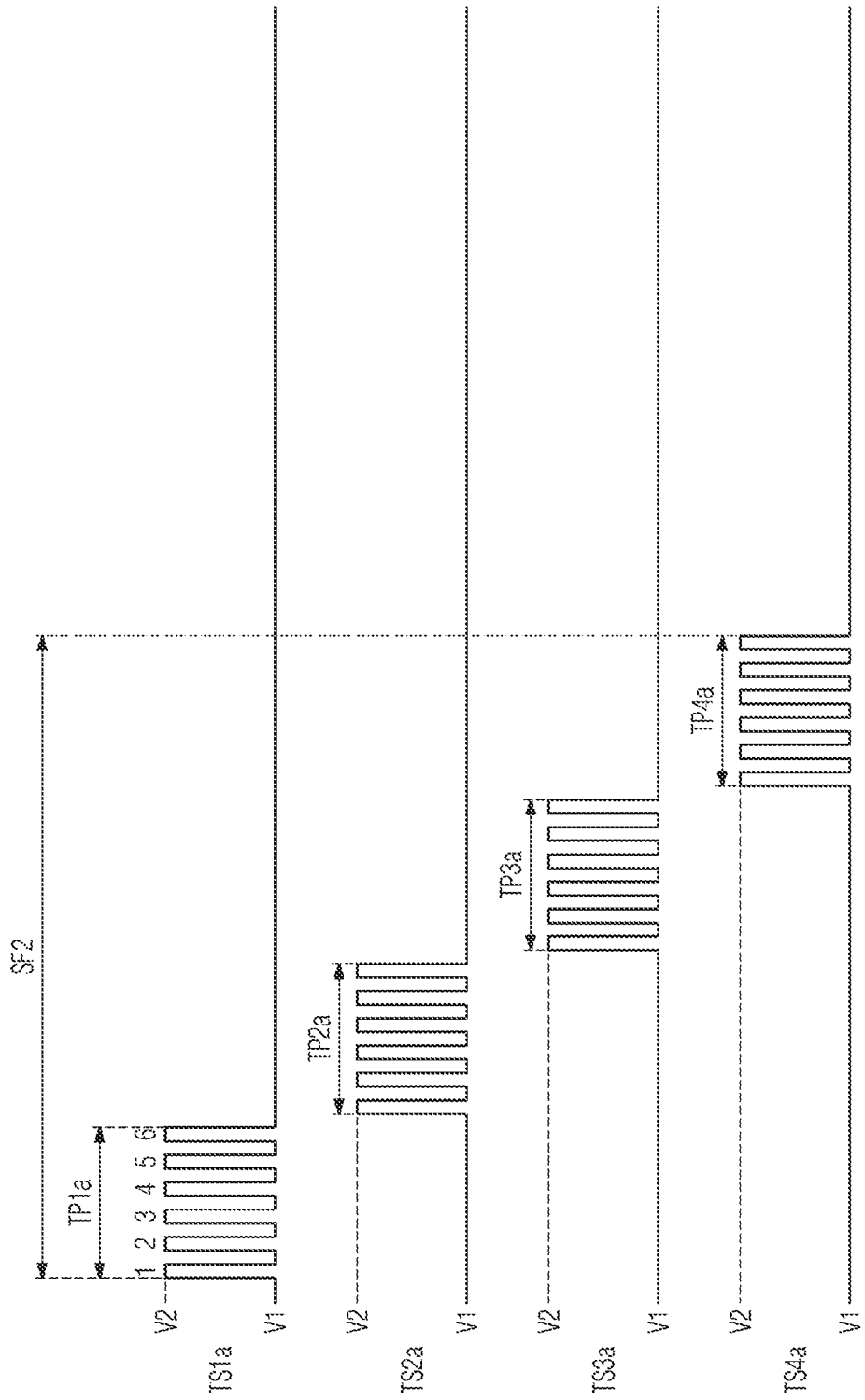

FIG. 12

| VSYNC | HSYNC | Driving Frequency |
|---|---|---|
| VAP1 | HAP1 : 300ns | 10Hz |
| | HAP2 : 500ns | 20Hz |
| | HAP3 : 700ns | 30Hz |
| | HAP4 : 900ns | 40Hz |
| | HAP5 : 1100ns | 50Hz |
| | HAP6 : 1300ns | 60Hz |
| | HAP7 : 1500ns | 70Hz |
| | HAP8 : 1700ns | 80Hz |
| | HAP9 : 1900ns | 90Hz |
| | HAP10 : 2100ns | 100Hz |
| VAP2 | HAP1 : 300ns | 110Hz |
| | HAP2 : 500ns | 120Hz |
| | HAP3 : 700ns | 130Hz |
| | HAP4 : 900ns | 140Hz |
| | HAP5 : 1100ns | 150Hz |
| | HAP6 : 1300ns | 160Hz |
| | HAP7 : 1500ns | 170Hz |
| | HAP8 : 1700ns | 180Hz |
| | HAP9 : 1900ns | 190Hz |
| | HAP10 : 2100ns | 200Hz |
| VAP3 | HAP1 : 300ns | 210Hz |
| | HAP2 : 500ns | 220Hz |
| | HAP3 : 700ns | 230Hz |
| | HAP4 : 900ns | 240Hz |
| | HAP5 : 1100ns | Reserved |
| | HAP6 : 1300ns | Reserved |
| | HAP7 : 1500ns | Reserved |
| | HAP8 : 1700ns | Reserved |
| | HAP9 : 1900ns | Reserved |
| | HAP10 : 2100ns | Reserved |

FIG. 13B

| NO. | [7:0] | | | | | | | | Driving Frequency |
|---|---|---|---|---|---|---|---|---|---|
| | B[7] | B[6] | B[5] | B[4] | B[3] | B[2] | B[1] | B[0] | |
| 1 | R | R | 0 | 0 | 0 | 0 | 0 | 0 | – |
| 2 | R | R | 0 | 0 | 0 | 0 | 0 | 1 | 4Hz |
| 3 | R | R | 0 | 0 | 0 | 0 | 1 | 0 | 8Hz |
| 4 | R | R | 0 | 0 | 0 | 0 | 1 | 1 | 12Hz |
| ... | | | | | | | | | |
| 63 | R | R | 1 | 1 | 1 | 1 | 0 | 1 | 248Hz |
| 64 | R | R | 1 | 1 | 1 | 1 | 1 | 0 | 252Hz |
| 65 | R | R | 1 | 1 | 1 | 1 | 1 | 1 | 256Hz |
| 66 ~ 256 | Reserved | | | | | | | | |

DISPLAY DEVICE

CROSS-REFERENCE TO RELATED APPLICATION

This U.S. non-provisional patent application claims priority under 35 U.S.C. § 119 to Korean Patent Application Nos. 10-2022-0129548, filed on Oct. 11, 2022 and 10-2023-0000488, filed on Jan. 3, 2023, the entire disclosures of which are incorporated by reference in their entireties herein.

1. TECHNICAL FIELD

The present disclosure relates to a display device. More particularly, the present disclosure relates to a display device capable of reducing power consumption.

2. DISCUSSION OF RELATED ART

Multimedia electronic devices, such as televisions, mobile phones, tablet computers, navigation units, and game units, include a display device to display images. The display devices include an input sensor that provides a touch-based input for enabling users to input information or a command. However, the input sensor may consume a large amount of power and a flicker may be observable on a display panel of the display device. Thus, there is a need for an input sensor for a display device that uses less power where the display device reduces instances of the flicker.

SUMMARY

The present disclosure provides a display device capable of reducing power consumption in an input sensor when driven with a variable frequency.

An embodiment of the inventive concept provides a display device including a display panel for displaying an image based on a display period during a display frame period, an input sensor, a display controller, and a sensor controller. The input sensor is disposed on the display panel for sensing an input based on a sensing frame. The display controller receives a vertical synchronization signal and a horizontal synchronization signal and controls driving of the display panel in response to the vertical synchronization signal and the horizontal synchronization signal. The sensor controller receives at least one of the vertical synchronization signal and the horizontal synchronization signal and provides a transmission signal including a plurality of sampling periods to the input sensor.

The display controller provides frequency information of the display frame period to the sensor controller using at least one of the vertical synchronization signal and the horizontal synchronization signal. The sensor controller controls the number of the sampling periods of the sensing frame based on the frequency information.

The frequency information of a driving frequency of the driving may be provided to the sensor controller using at least one of the vertical synchronization signal and the horizontal synchronization signal in a variable frequency mode. Accordingly, the number of sampling periods included in the transmission signal may be reduced during blank periods where display noise is relatively small. Thus, the overall power consumption of the display device may be reduced.

An embodiment of the inventive concept provides a display panel for displaying an image based on a display period during a display frame period, an input sensor, a display controller, and a sensor controller. The input sensor is disposed on the display panel for sensing an input during a sensing frame period. The display controller receives a synchronization and controls driving of the display panel using the synchronization signal. The sensing controller provides a transmission signal including a plurality of sampling periods to the input sensor. The display controller embeds frequency information of the display frame period into the synchronization signal to generate an embedded signal and provides the embedded signal to the sensor controller. The sensor controller extracts the frequency information from the embedded signal and adjusts a number of the sampling periods based on the extracted frequency information. The synchronization signal may be one of a vertical synchronization signal and a horizontal synchronization signal.

BRIEF DESCRIPTION OF THE DRAWINGS

The present disclosure will become readily apparent by reference to the following detailed description when considered in conjunction with the accompanying drawings wherein:

FIG. 3A is a cross-sectional view of a display device according to an embodiment of the present disclosure;

FIG. 3B is a cross-sectional view of a display device according to an embodiment of the present disclosure;

FIG. 7 is a view of an operation of a display panel and an input sensor for each frequency according to an embodiment of the present disclosure;

FIG. 8A is a waveform diagram of transmission signals output during a first sensing frame according to an embodiment of the present disclosure;

FIG. 8B is a waveform diagram of transmission signals output during a second sensing frame according to an embodiment of the present disclosure;

FIG. 12 is a table of driving frequencies obtained by a combination of a first duration of a vertical synchronization signal and a second duration of a horizontal synchronization signal according to an embodiment of the present disclosure;

FIG. 13B is a table of driving frequencies based on code information according to an embodiment of the present disclosure;

DETAILED DESCRIPTION

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

Hereinafter, embodiments of the present disclosure will be described with reference to accompanying drawings.

Figure 1:
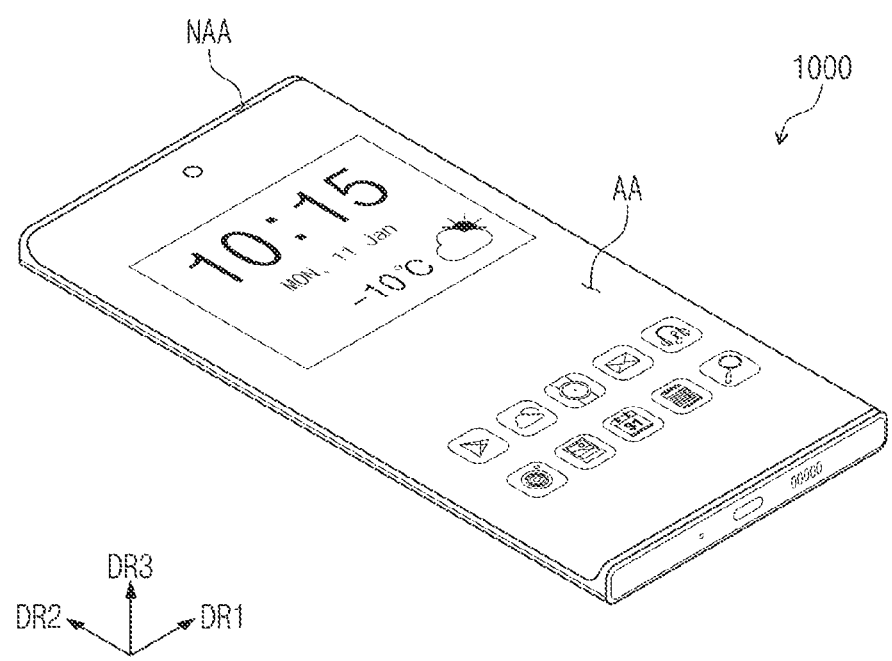
FIG. 1 is a perspective view of a display device according to an embodiment of the present disclosure.

FIG. 1 is a perspective view of a display device 1000 according to an embodiment of the present disclosure.

Referring to FIG. 1, the display device 1000 may be activated in response to electrical signals. The display device 1000 may be a mobile phone, a foldable mobile phone, a notebook computer, a television set, a tablet computer, a car navigation unit, a game unit, or a wearable device, however, it should not be particularly limited. FIG. 1 shows the mobile phone as a representative example of the display device 1000.

The display device 1000 may include an active area AA and a peripheral area NAA, which are defined therein. The display device 1000 may display an image through the active area AA. The active area AA may include a surface defined by a first direction DR1 and a second direction DR2. The peripheral area NAA may surround the active area AA.

A thickness direction of the display device 1000 may be substantially parallel to a third direction DR3 crossing the first and second directions DR1 and DR2. Accordingly, front (or upper) and rear (or lower) surfaces of each member of the display device 1000 may be defined with respect to the third direction DR3.

Figure 2:
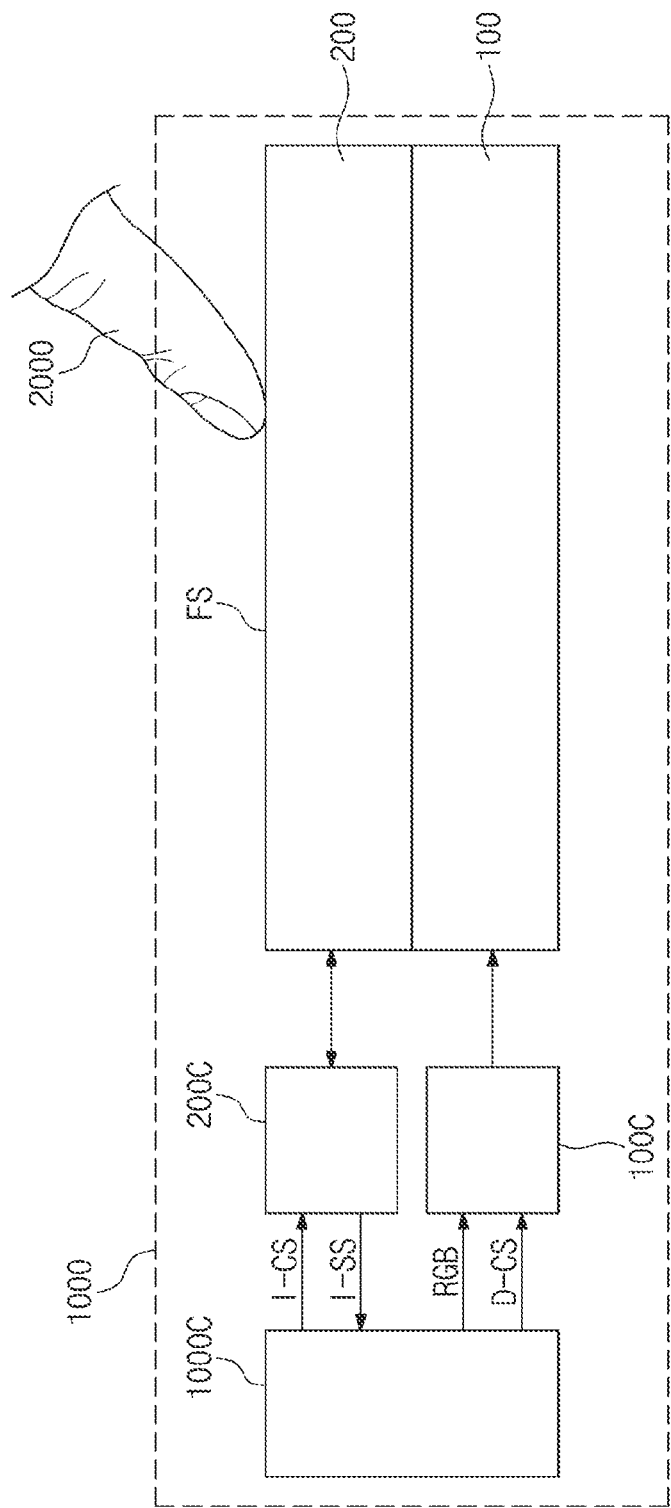
FIG. 2 is a view illustrating an operation of a display device according to an embodiment of the present disclosure.

FIG. 2 is a view illustrating an operation of the display device 1000 according to an embodiment of the present disclosure.

Referring to FIG. 2, the display device 1000 may include a display panel 100, an input sensor 200, a display controller 100C (e.g., a first controller circuit), a sensor controller 200C (e.g., a second controller circuit), and a main controller 1000C (e.g., a third controller circuit).

The display panel 100 may have a configuration appropriate to generate and display an image. The display panel 100 may be a light emitting type display panel. For example, the display panel 100 may be an organic light emitting display panel, an inorganic light emitting display panel, a quantum dot display panel, a micro-LED display panel, or a nano-LED display panel.

The input sensor 200 may be disposed on the display panel 100. The input sensor 200 may sense an external input 2000 applied thereto from the outside. The external input 2000 may include inputs generated by an input device that causes a variation in capacitance. As an example, the input sensor 200 may sense not only an input generated by a passive type input device such as part of a user's body (e.g., a finger) but also an input generated by an active type input device that transmits and receives a signal.

The main controller 1000C may control an overall operation of the display device 1000. For example, the main controller 1000C may control an operation of the display controller 100C and the sensor controller 200C. The main controller 1000C may include at least one microprocessor, and the main controller 1000C may be referred to as a host. The main controller 1000C may further include a graphics controller.

The display controller 100C may drive the display panel 100. The display controller 100C may receive image signal RGB and a display control signal D-CS from the main controller 1000C. The display control signal D-CS may include a variety of signals. As an example, the display control signal D-CS may include a vertical synchronization signal, a horizontal synchronization signal, a main clock signal, and a data enable signal. The display controller 100C may generate a scan control signal and a data control signal based on the display control signal D-CS to control the drive of the display panel 100.

The sensor controller 200C may control driving of the input sensor 200. The sensor controller 200C may receive a sensing control signal I-CS from the main controller 1000C. The sensing control signal I-CS may include a mode determination signal that determines a driving mode of the sensor controller 200C and a clock signal. The main controller 1000C may provide at least one of the signals included in the display control signal D-CS, e.g., at least one of the vertical synchronization signal and the horizontal synchronization signal, to the sensor controller 200C in addition to the sensing control signal I-CS.

The sensor controller 200C may calculate coordinate information of the input based on the signal from the input sensor 200 and may apply a coordinate signal I-SS having the coordinate information to the main controller 1000C. The main controller 1000C may perform an operation corresponding to the user's input based on the coordinate signal I-SS. For instance, the main controller 1000C may drive the display controller 100C based on the coordinate signal I-SS such that the display panel 100 may display a new application image.

The sensor controller 200C may further detect whether an object approaches or is near a surface FS of the display device 1000 or an input generated by an input device such as a pen based on the signal received from the input sensor 200.

FIG. 3A is a cross-sectional view of the display device 1000 according to an embodiment of the present disclosure.

Referring to FIG. 3A, the display device 1000 may include the display panel 100 and the input sensor 200. The display panel 100 may include a base layer 110, a circuit layer 120, a light emitting element layer 130, and an encapsulation layer 140.

The base layer 110 may provide a base surface on which the circuit layer 120 is disposed. The base layer 110 may be a glass substrate, a metal substrate, or a polymer substrate. However, the base layer 110 is not limited thereto. For example, the base layer 110 may be an inorganic layer, an organic layer, or a composite material layer.

The base layer 110 may have a multi-layer structure. For instance, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a coating or depositing process, and the insulating layer, the semiconductor layer, and the conductive layer may be selectively patterned through several photolithography processes. Then, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, an inorganic light emitting material, a quantum dot, a quantum rod, a micro-light-emitting diode (micro-LED), or a nano-LED.

The encapsulation layer 140 may be disposed on the light emitting element layer 130. The encapsulation layer 140 may protect the light emitting element layer 130 from moisture, oxygen, and a foreign substance such as dust particles.

The input sensor 200 may be disposed on the display panel 100. The input sensor 200 may sense the external input 2000 (refer to FIG. 2) applied thereto from the outside. The external input 2000 may be the user's input. The user's input may include various forms of external inputs, such as a touch by a part of the user's body, light, heat, pen, or pressure.

The input sensor 200 may be formed on the display panel 100 through successive processes. In this case, the input sensor 200 may be disposed directly on the display panel 100. In the following descriptions, the expression "the input sensor 200 is disposed directly on the display panel 100" means that no intervening elements are present between the input sensor 200 and the display panel 100. That is, a separate adhesive member need not be disposed between the input sensor 200 and the display panel 100. However, the input sensor 200 may be coupled with the display panel 100 by an adhesive member. The adhesive member may be a conventional adhesive.

The display device 1000 may further include an anti-reflective layer and an optical layer, which are disposed on the input sensor 200. The anti-reflective layer may reduce a reflectance with respect to an external light incident into the display device 1000 from the outside of the display device 1000. The optical layer may control a traveling direction of the light incident thereto from the display panel 100, and thus, a front luminance of the display device 1000 may be increased.

FIG. 3B is a cross-sectional view of a display device 1001 according to an embodiment of the present disclosure.

Referring to FIG. 3B, the display device 1001 may include a display panel 101 and an input sensor 201. The display panel 101 may include a base substrate 111, a circuit layer 121, a light emitting element layer 131, an encapsulation substrate 141, and a coupling member 151.

Each of the base substrate 111 and the encapsulation substrate 141 may be a glass substrate, a metal substrate, or a polymer substrate, however, the embodiment should not be particularly limited.

The coupling member 151 may be disposed between the base substrate 111 and the encapsulation substrate 141. The encapsulation substrate 141 may be coupled with the base substrate 111 or the circuit layer 121 by the coupling member 151. The coupling member 151 may include an inorganic material or an organic material. For example, the inorganic material may include a frit seal, and the organic material may include a photo-curable resin or a photo-plastic resin. However, the material for the coupling member 151 is not limited thereto.

The input sensor 201 may be disposed directly on the encapsulation substrate 141. The expression "the input sensor 201 is disposed directly on the encapsulation substrate 141" means that no intervening elements are present between the input sensor 201 and the encapsulation substrate 141. That is, a separate adhesive member need not be disposed between the input sensor 201 and the display panel 101. However embodiments are not limited thereto since an adhesive member may be further disposed between the input sensor 201 and the display panel 101.

Figure 4:
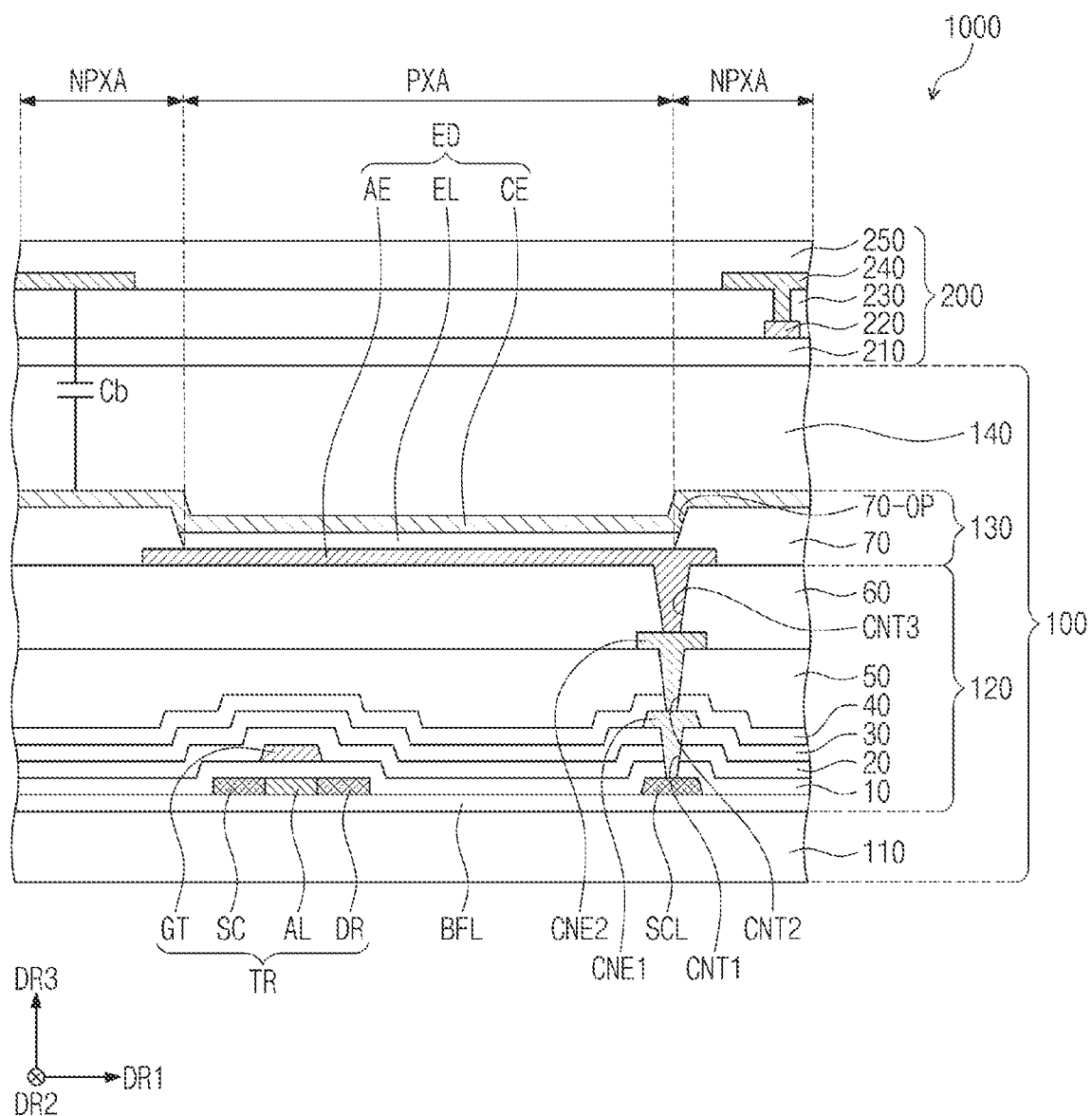
FIG. 4 is a cross-sectional view of a display device according to an embodiment of the present disclosure.

FIG. 4 is a cross-sectional view of the display device 1000 according to an embodiment of the present disclosure.

Referring to FIG. 4, at least one inorganic layer may be formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed in multiple layers. The inorganic layers formed in multiple layers may form a barrier layer and/or a buffer layer. In the present embodiment, the display panel 100 may further include a buffer layer BFL.

The buffer layer BFL may increase adhesion between the base layer 110 and the semiconductor pattern. The buffer layer BFL may include at least one of silicon oxide, silicon nitride, and silicon oxynitride. The buffer layer BFL may have a stack structure in which a silicon oxide layer and a silicon nitride layer are alternately stacked. For example, the buffer layer BFL may be alternating layers of silicon oxide and silicon nitride.

The semiconductor pattern may be disposed on the buffer layer BFL. The semiconductor pattern may include polysilicon, but is not limited thereto. For example, the semiconductor pattern may include amorphous silicon, low-temperature polycrystalline silicon, or oxide semiconductor.

FIG. 4 shows only a portion of the semiconductor pattern, and the semiconductor pattern may be further disposed in other areas. The semiconductor pattern may be arranged over a plurality of pixels according to a specific rule. The semiconductor pattern may have different electrical properties depending on whether it is doped or not or whether it is doped with an N-type dopant or a P-type dopant. The semiconductor pattern may include a first region with high conductivity and a second region with low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or may be doped at a concentration lower than the first region.

The first region may have a conductivity greater than that of the second region and may substantially serve as an electrode or signal line. The second region may substantially correspond to an active (or a channel) of a transistor. In other words, a portion of the semiconductor pattern may be the active (or active region) of the transistor, another portion of the semiconductor pattern may be a source (or source electrode) or a drain (or drain electrode) of the transistor, and the other portion of the semiconductor pattern may be a connection electrode or a connection signal line.

Each pixel may have an equivalent circuit that includes seven transistors, one capacitor, and a light emitting element ED, but the equivalent circuit of each pixel may be changed in various ways. FIG. 4 shows one transistor TR and the light emitting element ED included in the pixel.

A source SC, a channel AL, and a drain DR of the transistor TR may be formed from the semiconductor pattern. The source SC and the drain DR may extend in opposite directions to each other from the channel AL in a cross-section. FIG. 4 shows a portion of the connection signal line SCL formed from the semiconductor pattern. The connection signal line SCL may be connected to the drain DR of the transistor TR in a plane.

A first insulating layer 10 may be disposed on the buffer layer BFL. The first insulating layer 10 may commonly overlap the pixels and may cover the semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, and hafnium oxide. In the present embodiment, the first insulating layer 10 may have a single-layer structure of a silicon oxide layer. Not only the first insulating layer 10, but also an insulating layer of the circuit layer 120 to described later may be an inorganic layer and/or an organic layer and may have a single-layer or multi-layer structure. The inorganic layer may include at least one of the above-mentioned materials, but is not limited thereto.

A gate GT of the transistor TR may be disposed on the first insulating layer 10. The gate GT may be a portion of a metal pattern. The gate GT may overlap the channel AL. The gate GT may be used as a mask in a process of doping the semiconductor pattern.

A second insulating layer 20 may be disposed on the first insulating layer 10 and may cover the gate GT. The second insulating layer 20 may commonly overlap the pixels. The second insulating layer 20 may be an inorganic layer and/or an organic layer and may have a single-layer or multi-layer structure. The second insulating layer 20 may include at least one of silicon oxide, silicon nitride, and silicon oxynitride. In the present embodiment, the second insulating layer 20 may have a multi-layer structure of a silicon oxide layer and a silicon nitride layer.

A third insulating layer 30 may be disposed on the second insulating layer 20. The third insulating layer 30 may have a single-layer structure or a multi-layer structure. As an example, the third insulating layer 30 may have the multi-layer structure of a silicon oxide layer and a silicon nitride layer.

A first connection electrode CNE1 may be disposed on the third insulating layer 30. The first connection electrode CNE1 may be connected to the connection signal line SCL via a first contact hole CNT1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a second contact hole CNT2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element ED. For example, the light emitting element layer 130 may include an organic light emitting material, an inorganic light emitting material, a quantum dot, a quantum rod, a micro-light-emitting-diode (LED), or a nano-LED. Hereinafter, the organic light emitting element will be described as the light emitting element ED, but the light emitting element ED is not limited thereto.

The light emitting element ED may include a first electrode AE, a light emitting layer EL, and a second electrode CE. The first electrode AE may be disposed on the sixth insulating layer 60. The first electrode AE may be connected to the second connection electrode CNE2 via a third contact hole CNT3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The active area AA (refer to FIG. 1) may include a light emitting area PXA and a non-light-emitting area NPXA adjacent to the light emitting area PXA. The non-light-emitting area NPXA may surround the light emitting area PXA. In the present embodiment, the light emitting area PXA may correspond to a portion of the first electrode AE exposed through the opening 70-OP.

The light emitting layer EL may be disposed on the first electrode AE. The light emitting layer EL may be disposed in an area corresponding to the opening 70-OP. That is, the light emitting layer EL may be formed in each of the pixels after being divided into plural portions. In the case where the light emitting layer EL is formed in each of the pixels after being divided into the plural portions, each of the light emitting layers EL may emit a light having at least one of blue, red, and green colors, but is not limited thereto. The light emitting layers EL may be provided integrally with each other and may be commonly provided in the pixels. In this case, the light emitting layers EL provided integrally with each other may provide a blue light or a white light.

The second electrode CE may be disposed on the light emitting layer EL. The second electrode CE may have a single unitary form and may be commonly disposed over the pixels.

A hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plural pixels using an open mask.

The encapsulation layer 140 may be disposed on the light emitting element layer 130. The encapsulation layer 140 may include an inorganic layer, an organic layer, and an inorganic layer, which are sequentially stacked, however, layers of the encapsulation layer 140 are not limited thereto.

The inorganic layers may protect the light emitting element layer 130 from moisture and oxygen, and the organic layer may protect the light emitting element layer 130 from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but is not limited thereto.

The input sensor 200 may include a base insulating layer 210, a first conductive layer 220, a sensing insulating layer 230, a second conductive layer 240, and a cover insulating layer 250.

The base insulating layer 210 may be an inorganic layer that includes at least one of silicon nitride, silicon oxynitride, and silicon oxide. Alternatively, the base insulating layer 210 may be an organic layer that includes an epoxy-based resin, an acrylic-based resin, or an imide-based resin. The base insulating layer 210 may have a single-layer structure or a multi-layer structure of layers stacked one on another in the third direction DR3.

Each of the first conductive layer 220 and the second conductive layer 240 may have a single-layer structure or a multi-layer structure of layers stacked in the third direction DR3.

The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (ITZO), or the like.

In addition, the transparent conductive layer may include a conductive polymer such as PEDOT, a metal nanowire, a graphene, or the like.

The conductive layer having the multi-layer structure may include metal layers. The metal layers may have, for example, a three-layer structure of titanium/aluminum/titanium. The conductive layer having the multi-layer structure may include at least one metal layer and at least one transparent conductive layer.

At least one of the sensing insulating layer 230 and the cover insulating layer 250 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 230 and the cover insulating layer 250 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

A parasitic capacitance Cb may be generated between the input sensor 200 and the second electrode CE. The parasitic capacitance Cb may be referred to as a base capacitance. As a distance between the input sensor 200 and the second electrode CE decreases, the parasitic capacitance Cb may increase. As the parasitic capacitance Cb increases, a ratio of variation in capacitance to a reference value may decrease. The variation in capacitance may be a value reflecting a variation in capacitance, which is caused by the external input 2000 by an input device, for example, the user's body or a part of the body such as a finger.

Figure 5:
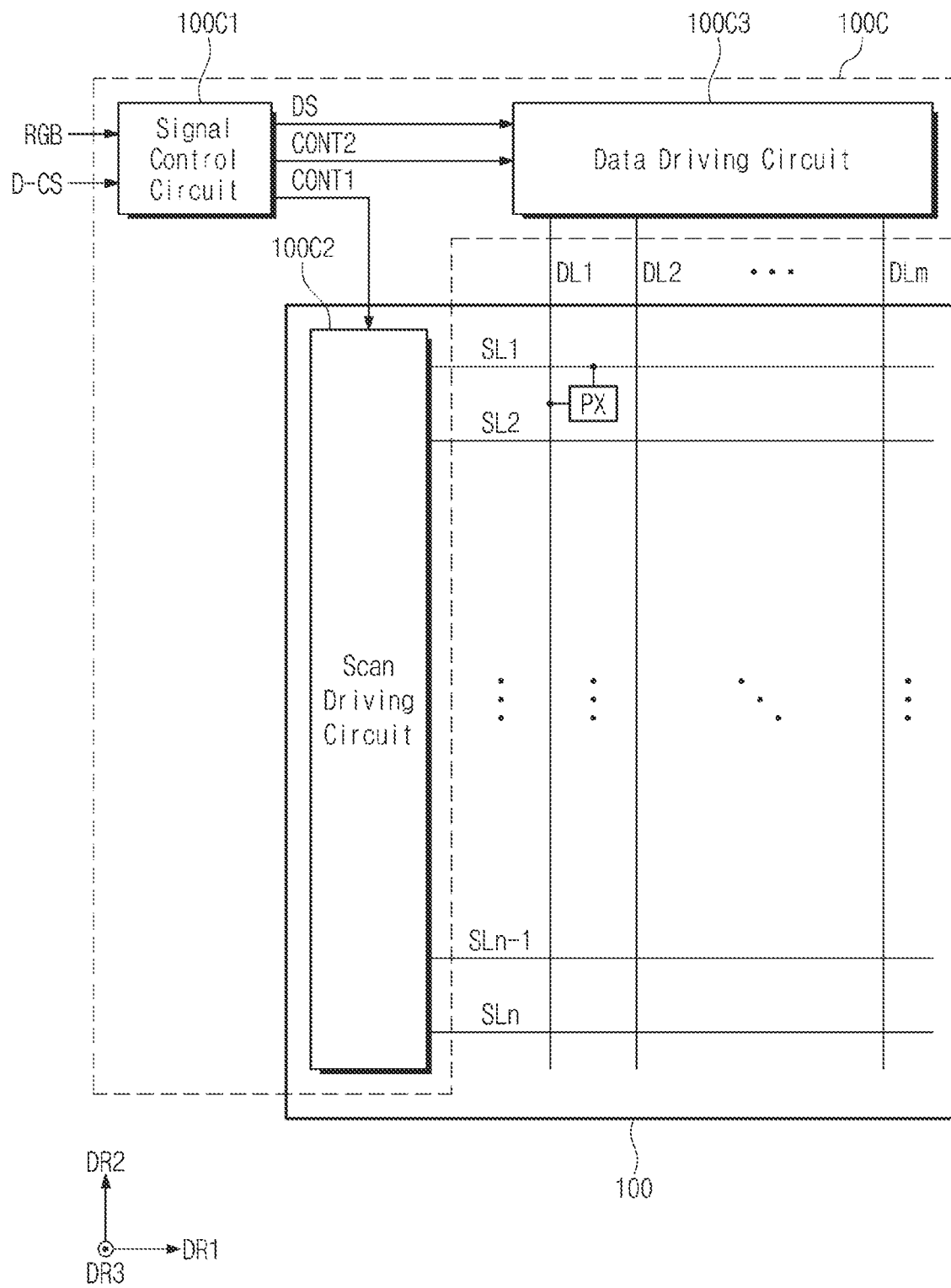
FIG. 5 is a block diagram of a display panel and a display controller according to an embodiment of the present disclosure.

FIG. 5 is a block diagram of the display panel and the display controller according to an embodiment of the present disclosure.

Referring to FIG. 5, the display panel 100 may include a plurality of scan lines SL1 to SLn, a plurality of data lines DL1 to DLm, and a plurality of pixels PX. Each of the pixels PX may be connected to a corresponding data line among the data lines DL1 to DLm and a corresponding scan line among the scan lines SL1 to SLn. According to the present disclosure, the display panel 100 may further include light emission control lines, and the display controller 100C may further include a light emission driving circuit providing light emission control signals to the light emission control lines. However, the configuration of the display panel 100 is not limited thereto.

Each of the scan lines SL1 to SLn may extend in the first direction DR1, and the scan lines SL1 to SLn may be arranged spaced apart from each other in the second direction DR2. Each of the data lines DL1 to DLm may extend in the second direction DR2, and the data lines DL1 to DLm may be arranged spaced apart from each other in the first direction DR1.

The display controller 100C may include a signal control circuit 100C, a scan driving circuit 100C2, and a data driving circuit 100C3.

The signal control circuit 100C may receive the image signal RGB and the display control signal D-CS from the main controller 1000C (refer to FIG. 2). The display control signal D-CS may include a variety of signals. As an example, the display control signal D-CS may include a vertical synchronization signal, a horizontal synchronization signal, a main clock, a data enable signal, and the like.

The signal control circuit 100C may generate a scan control signal CONT1 in response to the display control signal D-CS and may output the scan control signal CONT1 to the scan driving circuit 100C2. The scan control signal CONT1 may include a vertical start signal, a clock signal, and the like. The signal control circuit 100C1 may generate a data control signal CONT2 in response to the display control signal D-CS and may output the data control signal CONT2 to the data driving circuit 100C3. The data control signal CONT2 may include a horizontal start signal, an output enable signal, and the like.

In addition, the signal control circuit 100C may process the image signal RGB to meet operating conditions of the display panel 100, may generate image data DS, and may output the image data DS to the data driving circuit 100C3. The scan control signal CONT1 and the data control signal CONT2 may be used for the operations of the scan driving circuit 100C2 and the data driving circuit 100C3 but are not limited thereto.

The scan driving circuit 100C2 may drive the scan lines SL1 to SLn in response to the scan control signal CONT1. According to an embodiment, the scan driving circuit 100C2 may be formed through the same process as the circuit layer 120 (refer to FIG. 4) of the display panel 100, but is not limited thereto. The scan driving circuit 100C2 may be directly mounted on a predetermined area of the display panel 100 after being implemented as an integrated circuit (IC) or may be electrically connected to the display panel 100 after being mounted on a separate printed circuit board in a chip-on-film (COF) manner.

The data driving circuit 100C3 may output a data voltage (or a data signal) to the data lines DL1 to DLm in response to the data control signal CONT2 and the image data DS from the signal control circuit 100C1. The data driving circuit 100C3 may be directly mounted on a predetermined area of the display panel 100 after being implemented as an integrated circuit (IC) or may be electrically connected to the display panel 100 after being mounted on a separate printed circuit board in a chip-on-film (COF) manner, but is not limited thereto. The data driving circuit 100C3 may be formed through the same process as the circuit layer 120 (refer to FIG. 4) of the display panel 100.

Figure 6:
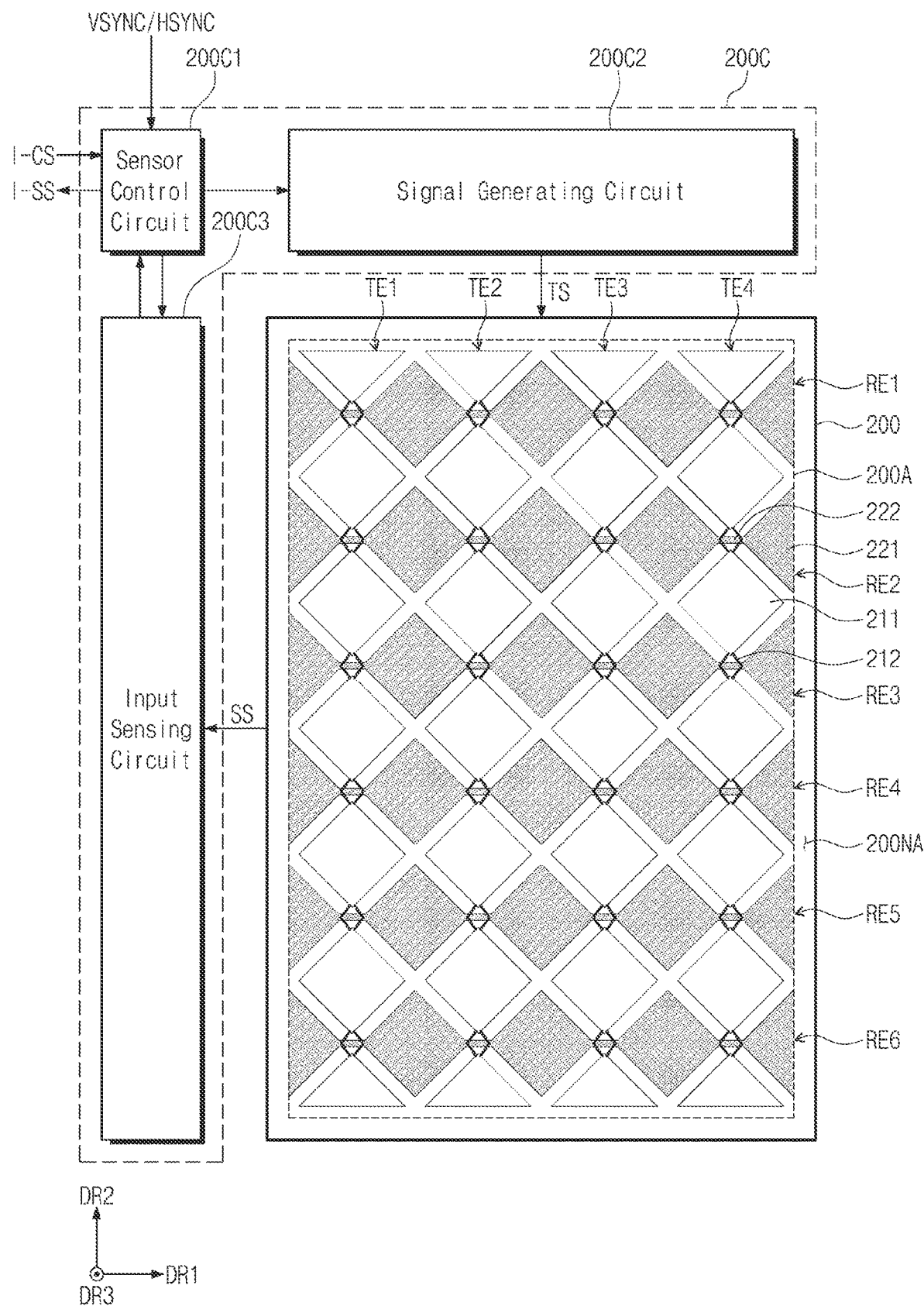
FIG. 6 is a block diagram of an input sensor and a sensor controller according to an embodiment of the present disclosure.

FIG. 6 is a block diagram of the input sensor 200 and the sensor controller 200C according to an embodiment of the present disclosure.

Referring to FIG. 6, the input sensor 200 may include a plurality of transmission electrodes TE1 to TE4 (or first sensing electrodes) and a plurality of reception electrodes RE1 to RE6 (or second sensing electrodes). The transmission electrodes TE1 to TE4 may extend in the second direction DR2 and may be arranged in the first direction DR1. The reception electrodes RE1 to RE6 may extend in the first direction DR1 and may be arranged in the second direction DR2. The transmission electrodes TE1 to TE4 may cross the reception electrodes RE1 to RE6. A capacitance may be formed between the transmission electrodes TE1 to TE4 and the reception electrodes RE1 to RE6.

The input sensor 200 may further include a plurality of first signal lines connected to the transmission electrodes TE1 to TE4 and a plurality of second signal lines connected to the reception electrodes RE1 to RE6.

The input sensor 200 may include a sensing area 200A and a non-sensing area 200NA. The sensing area 200A may correspond to the active area AA shown in FIG. 1, and the non-sensing area 200NA may correspond to the peripheral area NAA shown in FIG. 1. The sensing area 200A may be an area in which the transmission electrodes TE1 to TE4 and the reception electrodes RE1 to RE6 are arranged and an input is sensed. The non-sensing area 200NA may be an area in which the first and second signal lines are arranged and the input is not sensed.

Each of the transmission electrodes TE1 to TE4 may include a first sensing portion 211 and a bridge portion 212. Two first sensing portions 211 adjacent to each other may be electrically connected to each other by the bridge portion 212, but is not limited thereto. The first sensing portion 211 and the bridge portion 212 may be disposed on different layers from each other.

Each of the reception electrodes RE1 to RE6 may include a second sensing portion 221 and a connection portion 222. The second sensing portion 221 and the connection portion 222 may be provided integrally with each other and may be disposed on the same layer. In an embodiment, each of the transmission electrodes TE1 to TE4 has a mesh shape, and each of the reception electrodes RE1 to RE6 has a mesh shape.

The first and second sensing portions 211 and 221, the bridge portion 212, and the connection portion 222 may include a metal layer. In an embodiment, each of the first and second sensing portions 211 and 221, the bridge portion 212, and the connection portion 222 has a mesh shape.

As shown in FIG. 6, the sensor controller 200C may receive the sensing control signal I-CS from the main controller 1000C (refer to FIG. 2) and may provide the coordinate signal I-SS to the main controller 1000C.

The sensor controller 200C may be directly mounted on a predetermined area of the input sensor 200 after being implemented as an integrated circuit (IC) or may be electrically connected to the input sensor 200 after being mounted on a separate printed circuit board in a chip-on-film (COF) manner.

The sensor controller 200C may include a sensor control circuit 200C1, a signal generating circuit 200C2, and an input sensing circuit 200C3. The sensor control circuit 200C1 may control an operation of the signal generating circuit 200C2 and the input sensing circuit 200C3 in response to the sensing control signal I-CS.

The signal generating circuit 200C2 may output transmission signals TS to the input sensor 200, for example, the transmission electrodes TE1 to TE4. The input sensing circuit 200C3 may receive sensing signals SS from the reception electrodes RE1 to RE6 of the input sensor 200. The input sensing circuit 200C3 may convert an analog signal to a digital signal. As an example, the input sensing circuit 200C3 may amplify and filter the received analog-type sensing signals SS into a filtered signal and may convert the filtered signal into the digital signal.

The sensor control circuit 200C1 may generate the coordinate signal I-SS based on the digital signal provided from the input sensing circuit 200C3. In detail, the sensor control circuit 200C1 may generate the coordinate signal I-SS using the digital signal.

FIG. 7 is a view of an operation of the display panel (e.g., 100) and the input sensor (e.g., 200) for each frequency according to an embodiment of the present disclosure. FIG. 8A is a waveform diagram of transmission signals output during a first sensing frame (or frame period) according to an embodiment of the present disclosure, and FIG. 8B is a waveform diagram of transmission signals output during a second sensing frame (or frame period) according to an embodiment of the present disclosure.

Referring to FIGS. 2 and 7, the display panel 100 may operate in a normal frequency mode in which a driving frequency is fixed, i.e., the driving frequency is not variable, or in a variable frequency mode in which the driving frequency is variable. In the variable frequency mode, the driving frequency may be varied according to a frame rate. In the variable frequency mode shown in FIG. 7, the driving frequency of the display panel 100 is varied to a first driving frequency, e.g., about 120 Hz, a second driving frequency, e.g., about 60 Hz, and a third driving frequency, e.g., about 30 Hz as a representative example. However, the driving frequency is not limited to being varied to the first to third driving frequencies. For example, the driving frequency may be varied within a range from about 1 Hz to about 480 Hz.

In the normal frequency mode, a sensing frequency of the input sensor 200 may be fixed without being varied. FIG. 7 shows the sensing frequency fixed to about 240 Hz as a representative example, but the sensing frequency is not limited thereto. According to an embodiment, the sensing frequency may be fixed to about 120 Hz or about 480 Hz. The sensing frequency may be equal to or higher than the first driving frequency of the display panel 100. As an example, the first driving frequency may be the highest driving frequency at which the display panel 100 operates. Alternatively, the first driving frequency may be about 240 Hz or about 480 Hz. The first driving frequency may be referred to as a reference frequency or a maximum frequency. In an embodiment, the second driving frequency is lower than the first driving frequency.

In the case where the display panel 100 operates at the first driving frequency in the variable frequency mode, the display panel 100 may display the image based on a first display frame DF1. The first display frame DF1 may include a first display period DP1 and a first blank period BP1. The first display period DP1 may be a period in which the data signal is output to the display panel 100, and the first blank period BP1 may be a period in which the data signal is not output.

In the case where the display panel 100 operates at the second driving frequency in the variable frequency mode, the display panel 100 may display the image based on a second display frame DF2. The second driving frequency may be lower than the first driving frequency, and in this case, a duration of the second display frame DF2 may be greater than a duration of the first display frame DF1. As an example, when the first driving frequency is about 120 Hz and the second driving frequency is about 60 Hz, the duration of the second display frame DF2 (or second display frame period) may be two times greater than the duration of the first display frame DF1 (or first display frame period).

The second display frame DF2 may include a second display period DP2 and a second blank period BP2. The second display period DP2 may have substantially the same duration as the duration of the first display period DPL. In an embodiment, the second blank period BP2 has a duration greater than the duration of the first blank period BP1.

In the case where the display panel 100 operates at the third driving frequency in the variable frequency mode, the display panel 100 may display the image based on a third display frame DF3. The third driving frequency may be lower than the first and second driving frequencies, and in this case, the third display frame DF3 may have a duration greater than the duration of the first and second display frames DF1 and DF2. As an example, the first driving frequency may be about 120 Hz, the second driving frequency may be about 60 Hz, and the third driving frequency may be about 30 Hz. In an embodiment, the duration of the third display frame DF3 is two times greater than the duration of the second display frame DF2.

The third display frame DF3 may include a third display period DP3 and a third blank period BP3. The third display period DP3 may have substantially the same duration as the duration of the first display period DPL. In an embodiment, the third blank period BP3 has a duration greater than the duration of the second blank period BP2. As described above, as the driving frequency is lowered, the duration of the blank periods BP1, BP2, and BP3 in which the data signal is not output may increase.

Since the display periods DP1, DP2, and DP3 are periods in which the data signal is applied to the display panel 100, a coupling due to the parasitic capacitance between the input sensor 200 and the display panel 100 may increase more during the display periods DP1, DP2, and DP3 than during the blank periods BP1, BP2, and BP3. A display noise acting on the input sensor 200 in the display periods DP1, DP2, and DP3 may be relatively high, and the display noise acting on the input sensor 200 in the blank periods BP1, BP2, and BP3 may be relatively low.

In the variable frequency mode, the input sensor 200 may sense the input based on the first sensing frame SF1 or the second sensing frame SF2. The first sensing frame SF1 may be activated in response to the display periods DP1, DP2, and DP3, and the second sensing frame SF2 may be activated in response to the blank periods BP1, BP2, and BP3. Since the second sensing frame SF2 is activated in the blank periods BP1, BP2, and BP3 in which the display noise is relatively low, the second sensing frame SF2 may have a duration smaller than a duration of the first sensing frame SF1. That is, as a relatively short sensing frame is provided in the blank periods BP1, BP2, and BP3 in which the display noise is low, an overall power consumption of the display device 1000 may be reduced. For example, the first sensing frame SF1 may occur during the display periods DP1, DP2, and DP3 and the second sensing framed SF2 may occur during the blank periods BP1, BP2, and BP3.

Referring to FIGS. 6, 7, and 8A, first to fourth transmission signals TS1 to TS4 may be respectively applied to first to fourth transmission electrodes TE1 to TE4 during the first sensing frame SF1. FIG. 8A shows four transmission signals TS1 to TS4 respectively applied to four transmission electrodes TE1 to TE4, but the number of the transmission signals is not limited to four. The number of the transmission signals may be determined to correspond to the number of the transmission electrodes included in the input sensor 200. As an example, the number of the transmission electrodes may be p times greater than the number of the transmission signals. The "p" may be an integer equal to or greater than 1. As an example, even though eight transmission electrodes are provided, the number of the transmission signals may be four, and in this case, two transmission electrodes may receive the same transmission signal.

The first to fourth transmission signals TS1 to TS4 may be sequentially generated. That is, the first transmission signal TS1 may include a first sensing period TP1, and the second transmission signal TS2 may include a second sensing period TP2 following the first sensing period TP1. The third transmission signal TS3 may include a third sensing period TP3 following the second sensing period TP2, and the fourth transmission signal TS4 may include a fourth sensing period TP4 following the third sensing period TP3. In an embodiment, the first to fourth sensing periods TP1 to TP4 do not overlap each other.

The first to fourth transmission signals TS1 to TS4 may swing between the first voltage V1 and the second voltage V2 during the first to fourth sensing periods TP1 to TP4, respectively. Each of the first to fourth sensing periods TP1 to TP4 may include a plurality of sampling periods. As an example, each of the sampling periods may be a period in which the second voltage V2 is provided. FIG. 8A shows an embodiment in which each of the sensing periods TP1 to TP4 includes twelve sampling periods, but the number of the sampling periods included in each of the sensing periods TP1 to TP4 is not limited thereto. As an example, each of the sensing periods TP1 to TP4 may include tens or hundreds sampling periods.

Referring to FIGS. 6, 7, and 8B, first to fourth transmission signals TS1a to TS4a may be respectively applied to the first to fourth transmission electrodes TE1 to TE4 during the second sensing frame SF2. The first to fourth transmission signals TS1a to TS4a may include first to fourth sensing periods TP1a to TP4a, respectively. Each of the first to fourth sensing periods TP1a to TP4a may include a plurality of sampling periods. In an embodiment, the number of the sampling periods included in the first to fourth sensing periods TP1a to TP4a is different from the number of the sampling periods included in the first to fourth sensing periods TP1 to TP4. As an example, the number of the sampling periods included in the first to fourth sensing periods TP1a to TP4a may be smaller than the number of the sampling periods included in the first to fourth sensing periods TP1 to TP4.

FIG. 8B shows an embodiment in which each of the sensing periods TP1a to TP4a includes six sampling periods, but the number of the sampling periods included in each of the sensing periods TP1a to TP4a is not limited thereto. As an example, the number of the sampling periods included in each of the sensing periods TP1a to TP4a may be ½, ⅓, ⅔, etc., of the number of sampling periods included in each of the first to fourth sensing periods TP1 to TP4.

When the number of the sampling periods included in each of the sensing periods TP1a to TP4a decreases, the duration of each of the sensing periods TP1a to TP4a may be reduced overall, and consequently the duration of the second sensing frame SF2 may be reduced. As described above, due to the decrease of the number of the sampling periods, the second sensing frame SF2 may have the duration smaller than the duration of the first sensing frame SF1.

Consequently, when the number of the sampling periods, i.e., the number of samplings, decreases, the power consumption in the input sensor 200 may be reduced.

Figure 9:
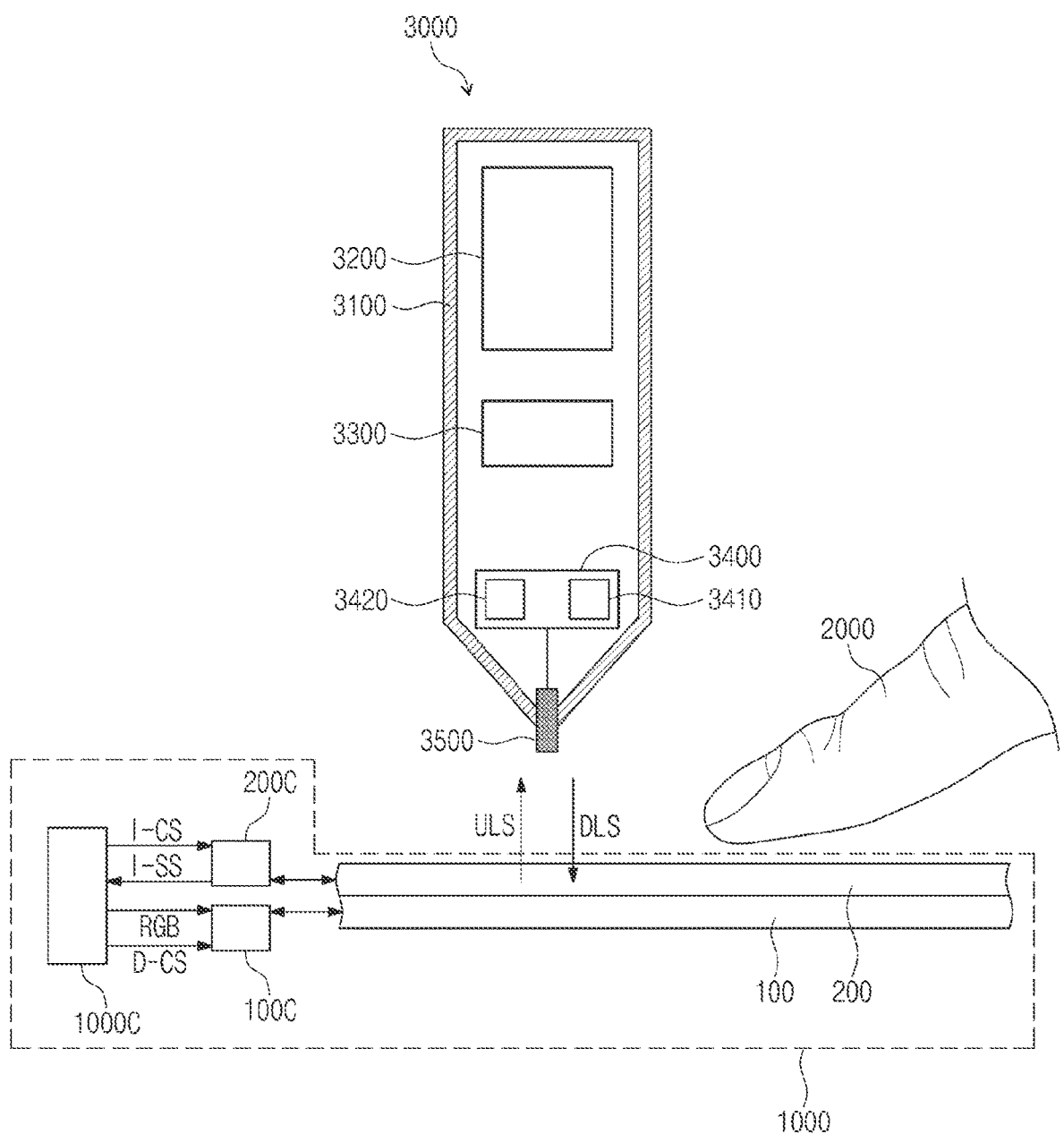
FIG. 9 is a block diagram of a display device and an input device according to an embodiment of the present disclosure.
Figure 10:
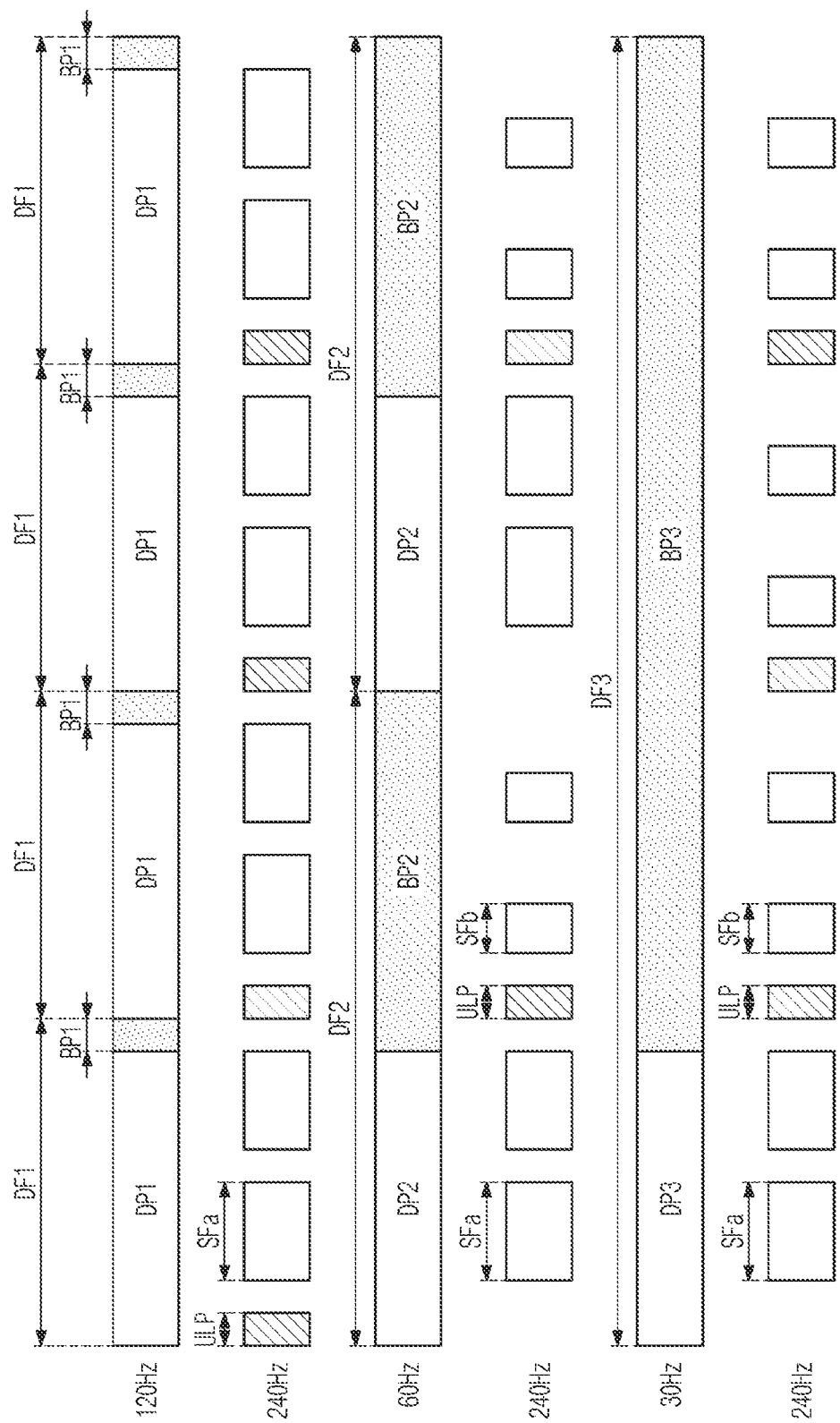
FIG. 10 is a view of an operation of a display panel and an input sensor for each frequency according to an embodiment of the present disclosure.

FIG. 9 is a block diagram of a display device 1000 and an input device 3000 according to an embodiment of the present disclosure. FIG. 10 is a view of an operation of a display panel and an input sensor for each frequency according to an embodiment of the present disclosure. In FIGS. 9 and 10, the same reference numerals denote the same elements in FIGS. 2 and 7, and thus, detailed descriptions of the same elements will be omitted.

Referring to FIG. 9, the display device 1000 may communicate with the input device 3000.

The input sensor 200 may sense an input applied thereto from the outside. The input sensor 200 may sense a first input generated by the external input 2000 and a second input generated by the input device 3000.

A sensor controller 200C may operate in a first mode to sense the first input generated by the external input 2000 or in a second mode to sense the second input generated by the input device 3000. The sensor controller 200C may control the input sensor 200 in the first mode or the second mode in response to a mode determination signal.

The input device 3000 may include a housing 3100, a power supply 3200, a pen controller 3300 (e.g., a controller circuit), a communication module 3400 (e.g., a transceiver), and a tip electrode (or a pen electrode) 3500. However, elements of the input device 3000 is not limited to the above-mentioned elements. For example, the input device 3000 may further include an electrode switch to switch a signal transmission mode to a signal reception mode or vice versa, a pressure sensor to sense a pressure, a memory to store information, or a gyro sensor to sense a rotation.

The housing 3100 may have a pen shape and may include an accommodating space defined therein. The power supply 3200, the pen controller 3300, the communication module 3400, and the tip electrode 3500 may be accommodated in the accommodating space defined in the housing 3100.

The power supply 3200 may supply a power to modules in the input device 3000, e.g., the pen controller 3300, the communication module 3400, and the like. The power supply 3200 may include a battery or a high capacity capacitor.

The pen controller 3300 may control an operation of the input device 3000. The pen controller 3300 may be, but is not limited to, an application-specific integrated circuit (ASIC). The pen controller 3300 may be configured to operate according to a designed program.

The communication module 3400 may include a receiver circuit 3410 and a transmitter circuit 3420. The receiver circuit 3410 may receive an uplink signal ULS from the input sensor 200. The transmitter circuit 3420 may output a downlink signal DLS to the input sensor 200. For example, the transmitter circuit 3420 may wirelessly transmit the downlink signal DSL to the input sensor 200. The receiver circuit 3410 may modulate a signal from the input sensor 200 into a signal that is able to be processed by the pen controller 3300, and the transmitter circuit 3420 may receive a signal from the pen controller 3300 and may modulate the signal into a signal that is able to be sensed by the input sensor 200.

The pen electrode 3500 may be electrically connected to the communication module 3400. A portion of the pen electrode 3500 may protrude from the housing 3100. In addition, the input device 3000 may further include a cover housing that covers the protruding portion of the pen electrode 3500 without being covered by the housing 3100. According to an embodiment, the pen electrode 3500 may be built into the housing 3100.

Referring to FIGS. 9 and 10, the input sensor 200 may sense the first input during a first sensing frame SFa or a second sensing frame SFb in a variable frequency mode. In an embodiment, the input sensor 200 transmits the uplink signal ULS to the input device 3000 during an uplink period ULP in the variable frequency mode. Accordingly, the input sensor 200 may determine the presence of the input device 3000 during the uplink period ULP or determine that the input device 300 has been brought near (e.g., within a certain distance of) the input sensor 200 during the uplink period ULP.

The first sensing frame SF1 may be activated in response to display periods DP1, DP2, and DP3, and the second sensing frame SF2 may be activated in response to blank periods BP1, BP2, and BP3. For example, the first sensing frame SF1 may occur during the display periods DP1, DP2, and DP3, and the second sensing frame SF2 may occur during the blank periods BP1, BP2, and BP3. Since a duration of a first blank period BP1 is relatively short when the display panel 100 operates at a first driving frequency, the uplink period ULP may be located to correspond to a first display period DPL.

In a case where the display panel 100 operates at a second or third driving frequency lower than the first driving frequency, a duration of the second and third blank periods BP2 and BP3 may increase more than the duration of the first blank period BP1. Accordingly, a sufficient duration for the uplink period ULP to be located corresponding to the second and third blank periods BP2 and BP3 may be secured.

In an embodiment, the uplink signal ULS swings at a relatively larger amplitude than the transmission signals TS1 to TS4 (refer to FIG. 8A). For example, the uplink signal ULS could swing between the first voltage V1 and a third voltage higher than the second voltage V2. In a case where the uplink period ULP in which the uplink signal ULS is transmitted is located to correspond to the blank periods BP2 and BP3, a flicker defect due to the uplink signal ULS may be prevented from being generated in the image displayed in the display panel 100.

As described above, the sensor controller 200C may receive information (hereinafter, referred to as frequency information) on the driving frequency of the display panel 100 to control the duration of the second sensing frame SF2 and the occurrence location of the uplink period ULP.

Hereinafter, embodiments in which the sensor controller 200C receives the frequency information will be described in detail.

FIGS. 11A to 11D are waveform diagrams of vertical synchronization signals and horizontal synchronization signals combined to implement the frequency information according to an embodiment of the present disclosure, and FIG. 12 is a table of driving frequencies obtained by a combination of a first duration of a vertical synchronization signal and a second duration of a horizontal synchronization signal according to an embodiment of the present disclosure.

Referring to FIGS. 6 and 11A to 11D, the sensor controller 200C may receive at least one of the vertical synchronization signal VSYNC and the horizontal synchronization signal HSYNC from the main controller 1000C (refer to FIG. 2) or the display controller 100C (refer to FIG. 2). The vertical synchronization signal VSYNC may be a signal to determine a start time point of a display frame DF. In this case, the display frame DF may be one of the first, second, and third display frames DF1, DF2, and DF3 shown in FIG. 7. The vertical synchronization signal VSYNC may include vertical active periods VAP1, VAP2, and VAP3 and vertical non-active periods VNAP1 and VNAP2, which are located in the display frame DF. As an example, the vertical active periods VAP1, VAP2, and VAP3 may be a low level period, and the vertical non-active periods VNAP1 and VNAP2 may be a high level period, but the present disclosure is not limited thereto. Alternatively, the vertical active periods VAP1, VAP2, and VAP3 may be the high level period, and the vertical non-active periods VNAP1 and VNAP2 may be the low level period. The display controller 100C may adjust a duration of each of the vertical active periods VAP1, VAP2, and VAP3 according to the driving frequency.

The horizontal synchronization signal HSYNC may include horizontal active periods HAP1 to HAP10 located in the vertical active periods VAP1, VAP2, and VAP3. As an example, the horizontal active periods HAP1 to HAP10 may be the low level period, but is not limited thereto. Alternatively, the horizontal active periods HAP1 to HAP10 may be the high level period. The display controller 100C may adjust a duration of the horizontal active periods HAP1 to HAP10 according to the driving frequency.

The horizontal synchronization signal HSYNC may be activated based on one horizontal scan period HSP. That is, the horizontal scan period HSP may be defined as a cycle of the horizontal synchronization signal HSYNC. As an example, the vertical active periods VAP1, VAP2, and VAP3 may have the duration corresponding to n times the horizontal scan period HSP. In this case, the "n" may be an integer equal to or greater than 1.

Figure 11A:
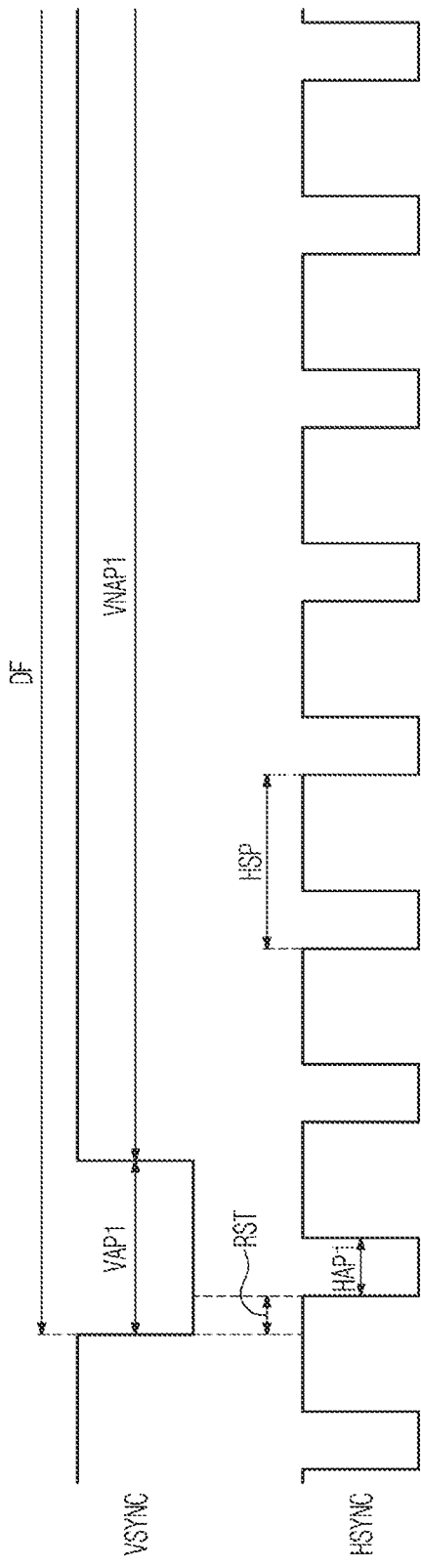
FIGS. 11A to 11D are waveform diagrams of vertical synchronization signals and horizontal synchronization signals combined to implement frequency information according to an embodiment of the present disclosure.
Figure 11B:
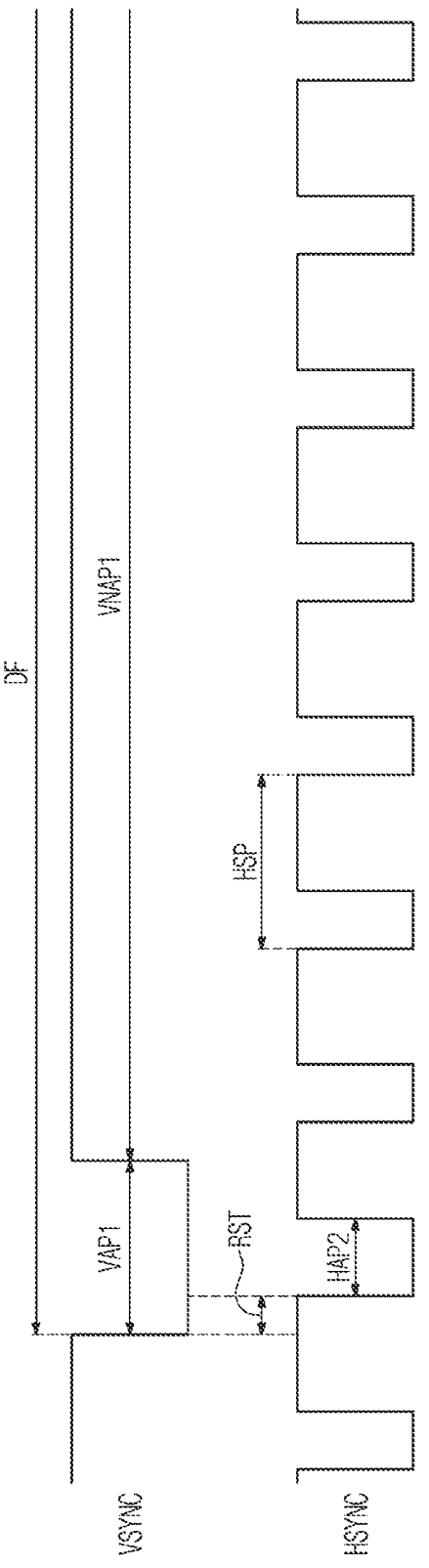
Figure 11C:
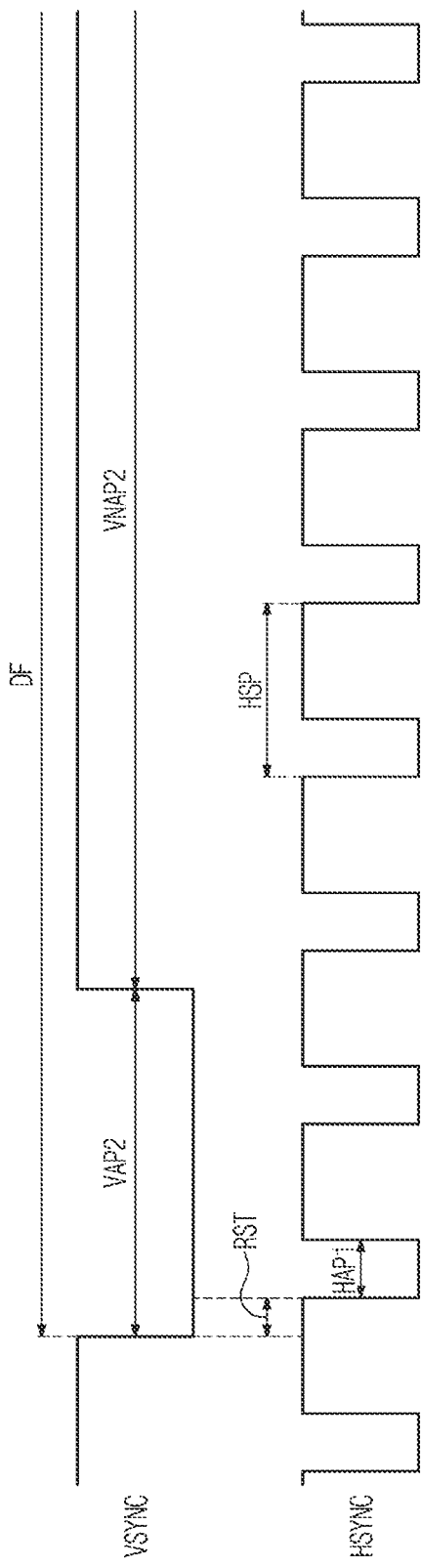
Figure 11D:
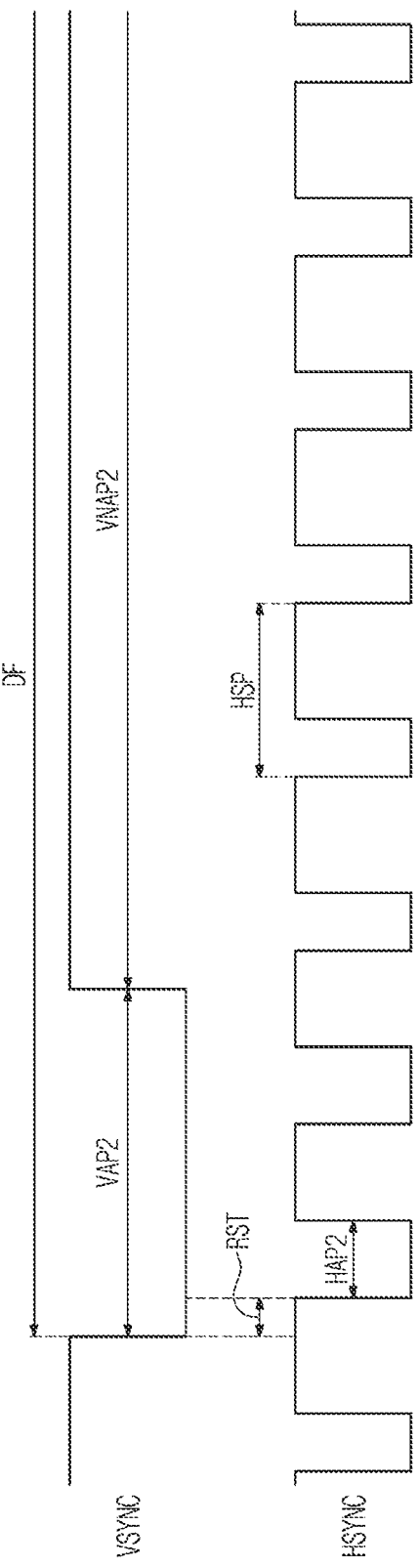

Referring to FIGS. 11A to 11C and 12, as an example, the vertical synchronization signal VSYNC may have one of a first vertical active period VAP1, a second vertical active period VAP2, and a third vertical active period VAP3. As an example, the first vertical active period VAP1 may correspond to one times the horizontal scan period HSP, the second vertical active period VAP2 may correspond to twice the horizontal scan period HSP, and the third vertical active period VAP3 may correspond to three times the horizontal scan period HSP. In FIGS. 11A to 11C, each of the first, second, and third vertical active periods VAP1, VAP2, and VAP3 may be an integer multiple of the horizontal scan period HSP, but the present disclosure is not limited thereto.

As an example, the horizontal synchronization signal HSYNC may have one of first to tenth horizontal active periods HAP1 to HAP10. Two horizontal active periods adjacent to each other among the first to tenth horizontal active periods HAP1 to HAP10 may have an interval of about 200 ns or precisely 200 ns. For example, the time between two horizontal active periods may be about 200 ns or precisely 200 ns. As an example, when the first horizontal active period HAP1 is about 300 ns or precisely 300 ns, the second horizontal active period HAP2 may be about 500 ns or precisely 500 ns.

The frequency information may be implemented by a combination of the duration of the vertical active period and the duration of the horizontal active period. As an example, the frequency information from about 10 Hz to about 240 Hz may be expressed in units of 10 Hz by combining the duration of the vertical active period and the duration of the horizontal active period. The frequency information of about 10 Hz may be implemented by the combination of the first vertical active period VAP1 and the first horizontal active period HAP1, and the frequency information of about 20 Hz may be implemented by the combination of the first vertical active period VAP1 and the second horizontal active period HAP2. The frequency information of about 110 Hz may be implemented by the combination of the second vertical active period VAP2 and the first horizontal active period HAP1, and the frequency information of about 120 Hz may be implemented by the combination of the second vertical active period VAP2 and the second horizontal active period HAP2.

In a case where the number of the vertical active periods increases to four or more or the interval between the horizontal active periods is adjusted to less than about 200 ns, the number of the frequency information that are able to be expressed may increase. As an example, when the interval between the horizontal active periods is adjusted to less than about 100 ns, twenty horizontal active periods may correspond to one vertical active period, and in this case, the frequency information from about 10 Hz to about 240 Hz may be expressed in units of 5 Hz.

As an example, the horizontal active period may correspond to one of a plurality of horizontal active ranges. Each of the horizontal active ranges may be set to about 200 ns or precisely 200 ns. As an example, among the horizontal active ranges, a first horizontal active range may be set to a range from about or precisely 200 ns to about or precisely 399 ns, and a second horizontal active range may be set to a range from about or precisely 400 ns to about or precisely 599 ns. That is, in a case where the first horizontal active period HAP1 has one value within the first horizontal active range, the first horizontal active period HAP1 may be recognized as one of 10 Hz, 110 Hz, or 210 Hz. In addition, in a case where the second horizontal active period HAP2 has one value within the second horizontal active range, the second horizontal active period HAP2 may be recognized as one of 20 Hz, 120 Hz, or 220 Hz.

The start time point of the horizontal active period may be delayed by a reference setup time RST from the start time point of the vertical active period. As an example, the start time point of the first and second horizontal active periods HAP1 and HAP2 may be delayed by the reference setup time RST from the start time point of the first vertical active period VAP1. The reference setup time RST may be set to about 100 ns or precisely 100 ns, but is not limited thereto. For example, a horizontal active period may occur in response a falling edge of the vertical synchronization signal VSYNC and after delaying for the reference setup time RST.

Figure 13A:
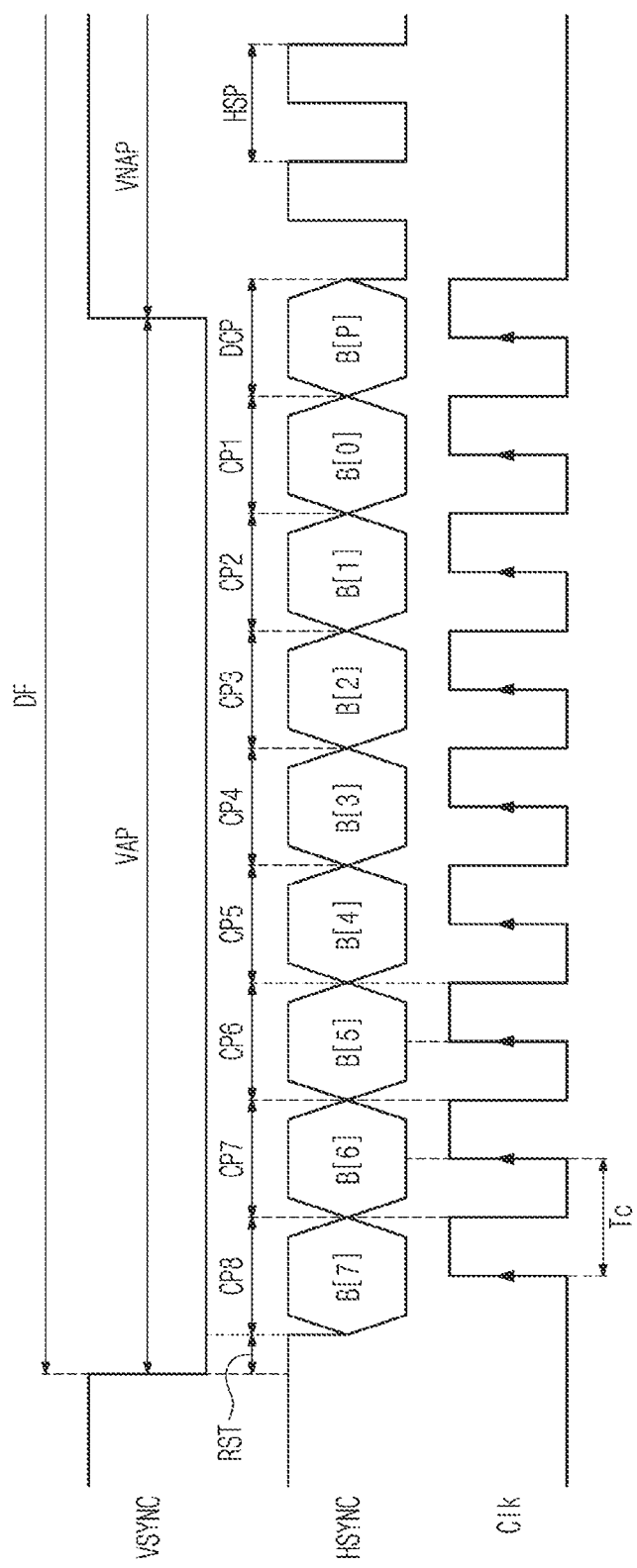
FIG. 13A is a waveform diagram of a vertical synchronization signal, a horizontal synchronization signal including code information, and a reference clock signal according to an embodiment of the present disclosure.

FIG. 13A is a waveform diagram of a vertical synchronization signal, a horizontal synchronization signal including code information, and a reference clock signal according to an embodiment of the present disclosure, and FIG. 13B is a table of driving frequencies based on the code information according to an embodiment of the present disclosure.

Referring to FIGS. 13A and 13B, the vertical synchronization signal VSYNC may include a vertical active period VAP and a vertical non-active period VNAP, which are located in a display frame DF. In an embodiment, the display controller 100C (refer to FIG. 2) embeds frequency information into the horizontal synchronization signal HSYNC in response to the vertical active period VAP and may provide the embedded frequency information to the sensor controller 200C (refer to FIG. 2).

The horizontal synchronization signal HSYNC may be activated based on one horizontal scan period HSP in the vertical non-active period VNAP. That is, the horizontal scan period HSP may be defined as a cycle of the horizontal synchronization signal HSYNC. As an example, the vertical active period VAP may have a duration corresponding to n times the horizontal scan period HSP. In this case, the "n" may be an integer equal to or greater than about 1. As an example, the vertical active period VAP may have the duration corresponding to nine times the duration of the horizontal scan period HSP.

The frequency information may be an M-bit signal, and the horizontal synchronization signal HSYNC may include m code periods CP1 to CP8 located in the vertical active period VAP. The "m" may be an integer equal to or greater than 1. When the frequency information is the M-bit signal, $2^m$ driving frequencies may be expressed. A duration of each of the m code periods CP1 to CP8 may be the same as the duration of the horizontal scan period HSP.

FIGS. 13A and 13B show the embodiment in which the "m" is 8, but the present disclosure is not limited thereto. As shown in FIG. 13B, although the frequency information is an 8-bit signal, the driving frequency may be expressed using only 6 bits (B[5] to B[0]) among 8 bits (B[7] to B[0]). In this case, among eight code periods CP1 to CP8 (hereinafter, referred to as first, second, third, fourth, fifth, sixth, seventh, and eighth code periods), the frequency information may be expressed using only states of six code periods CP1 to CP6, that is, first to sixth code periods.

As an example, when the frequency information is "000001", the driving frequency may be about 4 Hz. In this case, the horizontal synchronization signal HSYNC may have a low logic state during the second to sixth code periods CP2 to CP6 among the first to sixth code periods CP1 to CP6 and may have a high logic state during the first code period CP1. When the frequency information is "000010", the driving frequency may be about 8 Hz. In this case, the horizontal synchronization signal HSYNC may have the low logic state during the first code period CP1 and the third to sixth code periods CP3 to CP6 and may have the high logic state during the second code period CP2. When the frequency information is "111111", the driving frequency may be about 256 Hz. In this case, the horizontal synchronization signal HSYNC may have the high logic state during the first to sixth code periods CP1 to CP6. The present embodiment shows a case where the seventh and eighth code periods CP7 and CP8 are not used to express the frequency information and are left in reserve. However, alternatively, the frequency information may be expressed using all the eight code periods CP1 to CP8. For example, the horizontal synchronization signal HSYNC may have a low logic state during a given code period to indicate a '0' of the frequency information and have a high logic state during the given code period to indicate a '1' of the frequency information.

The horizontal synchronization signal HSYNC may further include a dummy code period DCP located in the vertical active period VAP. In an embodiment, the dummy code period DCP is used as a parity bit B[P] to check whether an error occurs in the frequency information. The dummy code period DCP may have substantially the same duration as the duration of each of the m code periods CP1 to CP8.

The sensor controller 200C (refer to FIG. 2) may determine whether the horizontal synchronization signal HSYNC has the high logic state or the low logic state in each of the m code periods CP1 to CP8 in response to a clock signal Clk. The clock signal Clk may be an internal clock signal present in the sensor controller 200C or may be an external clock signal provided from the display controller 100C (refer to FIG. 2).

The clock signal Clk may have a cycle corresponding to each of the m code periods CP1 to CP8. That is, the duration of each of the code periods CP1 to CP8 may be the same as a cycle Tc of the clock signal Clk.

As an example, the sensor controller 200C may determine the state of the horizontal synchronization signal HSYNC at a rising time point of the clock signal Clk. When the horizontal synchronization signal HSYNC has the high logic state at the rising time point of the clock signal Clk, the horizontal synchronization signal HSYNC may be recognized as "1", and when the horizontal synchronization signal HSYNC has the low logic state, the horizontal synchronization signal HSYNC may be recognized as "0". Alternatively, the sensor controller 200C may determine the state of the horizontal synchronization signal HSYNC using an inverted clock signal, which has an inverted phase with respect to the clock signal Clk, at a falling time point of the inverted clock signal.

Among the m code periods CP1 to CP8, the start time point of the code period that first occurs, that is, the eighth code period CP8, may be delayed by the reference setup time RST from the start time point of the vertical active period VAP. As an example, the start time point of the eighth code period CP8 may be delayed by the reference setup time RST from the start time point of the vertical active period VAP. The reference setup time RST may be set to about 100 ns or precisely 100 ns, but is not limited thereto.

Figure 14:
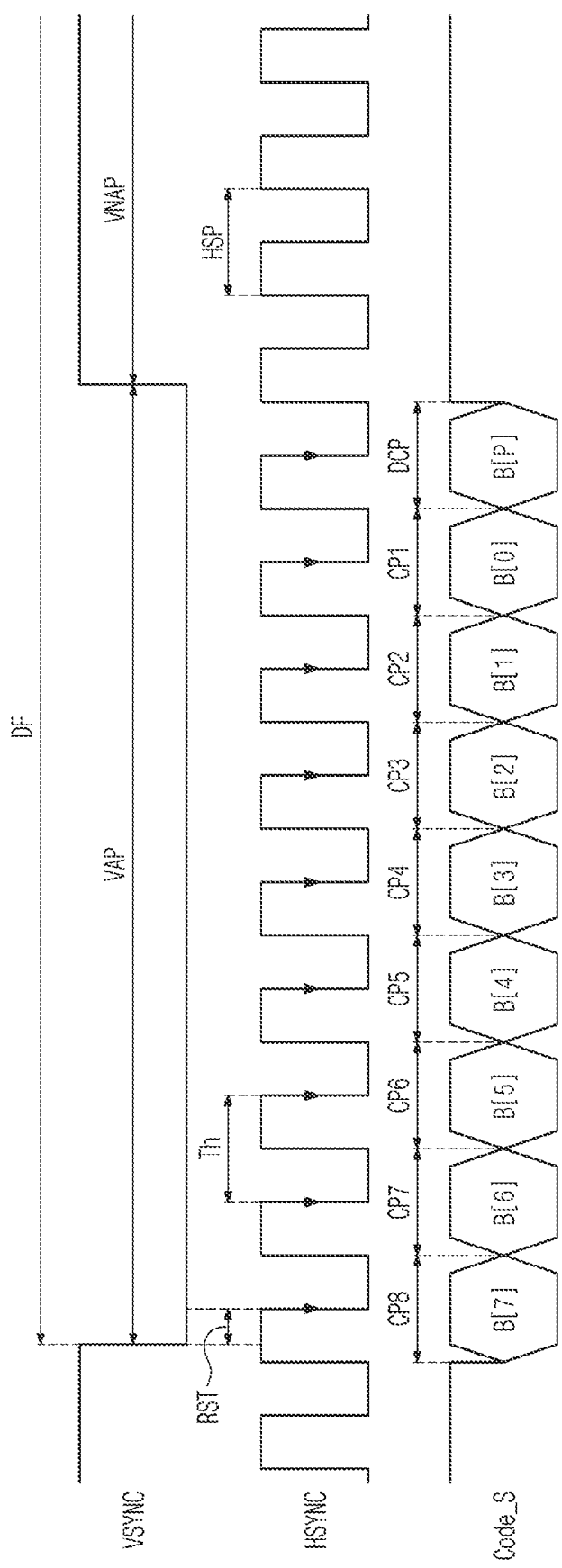
FIG. 14 is a waveform diagram of a vertical synchronization signal, a horizontal synchronization signal, and a code signal including code information according to an embodiment of the present disclosure.

FIG. 14 is a waveform diagram of a vertical synchronization signal, a horizontal synchronization signal, and a code signal including code information according to an embodiment of the present disclosure.

Referring to FIG. 14, the vertical synchronization signal VSYNC may include a vertical active period VAP and a vertical non-active period VNAP, which are located in a display frame DF. The vertical active period VAP may have a duration corresponding to n times a horizontal scan period HSP. In this case, the "n" may be an integer equal to or greater than 1. As an example, the vertical active period VAP may have the duration corresponding to nine times the duration of the horizontal scan period HSP.

The display controller 100C (refer to FIG. 2) may embed frequency information into the code signal Code_S in response to the vertical active period VAP and may provide the embedded frequency information to the sensor controller 200C (refer to FIG. 2). The frequency information may be an M-bit signal, and the code signal Code_S may include m code periods CP1 to CP8 located in the vertical active period VAP. The "m" may be an integer equal to or greater than 1. When the frequency information is the M-bit signal, $2^m$ driving frequencies may be expressed. In an embodiment, the code signal Code_S is activated only in the vertical active period VAP and is maintained in an inactive state in the vertical non-active period VNAP. For example, the code signal Code_S may have a constant level during the inactive state.

The code signal Code_S may further include a dummy code period DCP located in the vertical active period VAP. The dummy code period DCP may be used as a parity bit B[P] to check whether an error occurs in the frequency information.

The sensor controller 200C (refer to FIG. 2) may determine whether the code signal Code_S has a high logic state or a low logic state in each of the m code periods CP1 to CP8 in response to the horizontal synchronization signal HSYNC. The horizontal synchronization signal HSYNC may be activated with a cycle of a first reference period Th in the vertical active period VAP. The first reference period Th may have a duration corresponding to each of the m code periods CP1 to CP8. As an example, the first reference period Th may have the duration corresponding to the horizontal scan period HSP.

The sensor controller 200C may determine a state of the code signal Code_S at a falling time point or a falling edge of the horizontal synchronization signal HSYNC. When the code signal Code_S has the high logic state at the falling time point of the horizontal synchronization signal HSYNC, the code signal Code_S may be recognized as "1", and when the code signal Code_S has the low logic state, the code signal Code_S may be recognized as "0".

A start time point of the first reference period Th may be delayed by a reference setup time RST from a start time point of the vertical active period VAP. As an example, the reference setup time RST may be set to about 100 ns or precisely 100 ns, but is not limited thereto.

Figure 15:
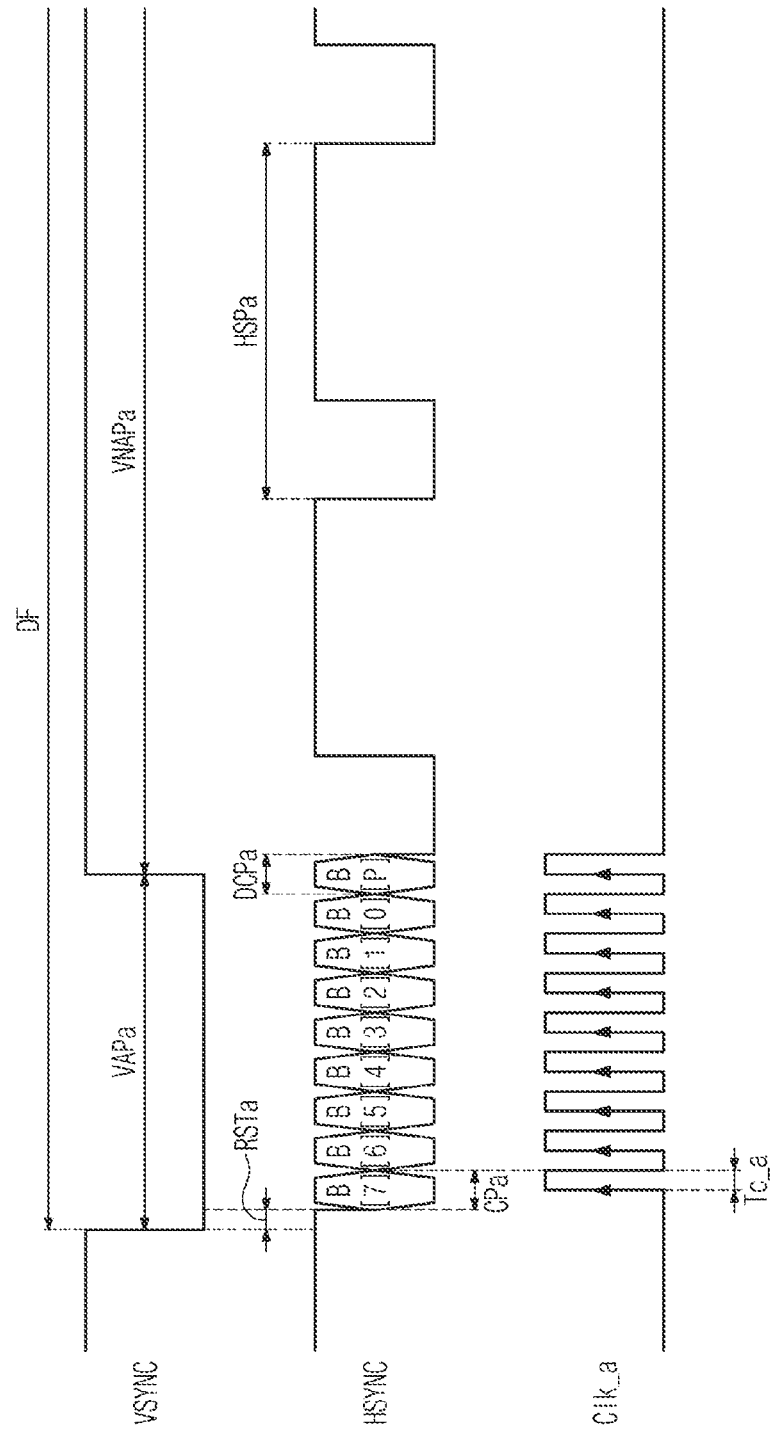
FIG. 15 is a waveform diagram of a vertical synchronization signal, a horizontal synchronization signal including code information, and a reference clock signal according to an embodiment of the present disclosure.

FIG. 15 is a waveform diagram of a vertical synchronization signal, a horizontal synchronization signal including code information, and a reference clock signal according to an embodiment of the present disclosure.

Referring to FIG. 15, the vertical synchronization signal VSYNC may include a vertical active period VAPa and a vertical non-active period VNAPa, which are located in a display frame DF. In an embodiment, the display controller 100C (refer to FIG. 2) embeds frequency information into the horizontal synchronization signal HSYNC in response to the vertical active period VAPa and may provide the embedded frequency information to the sensor controller 200C (refer to FIG. 2).

The horizontal synchronization signal HSYNC may be activated based on one horizontal scan period HSPa in the vertical non-active period VNAPa. That is, the horizontal scan period HSPa may be defined as a cycle of the horizontal synchronization signal HSYNC. As an example, the vertical active period VAPa may have a duration corresponding to n times the horizontal scan period HSPa. In this case, the "n" may be an integer equal to or greater than 1. As an example, the vertical active period VAPa may have substantially the same duration as a duration of the horizontal scan period HSPa.

The frequency information may be an M-bit signal, and the horizontal synchronization signal HSYNC may include m code periods CPa located in the vertical active period VAPa. The "m" may be an integer equal to or greater than 1. When the frequency information is the M-bit signal, $2^m$ driving frequencies may be expressed. Each of the m code periods Cpa may have a duration equal to or smaller than 1/m times the duration of the horizontal scan period HSPa.

The horizontal synchronization signal HSYNC may further include a dummy code period DCPa located in the vertical active period VAPa. The dummy code period DCPa may be used as parity bit B [P] to check whether an error occurs in the frequency information. The dummy code period DCPa may have substantially the same duration as the duration of each of the m code periods Cpa. In a case where one dummy code period DCPa is located in the vertical active period VAPa, the duration of each of the m code periods Cpa may be the same as 1/(m+1) times the duration of the horizontal scan period HSPa.

The sensor controller 200C (refer to FIG. 2) may determine whether the horizontal synchronization signal HSYNC has a high logic state or a low logic state in response to a clock signal clk_a in each of the m code periods Cpa. The clock signal Clk_a may be an internal clock signal present in the sensor controller 200C or an external clock signal provided from the outside, e.g., the display controller 100C.

The clock signal Clk_a may have a cycle corresponding to each of the m code periods Cpa. That is, the duration of each of the code periods Cpa may be the same as a cycle Tc_a of the clock signal Clk_a.

As an example, the sensor controller 200C may determine the state of the horizontal synchronization signal HSYNC at a rising time point or rising edge of the clock signal Clk_a. When the horizontal synchronization signal HSYNC has the high logic state at the rising time point of the clock signal Clk_a, the horizontal synchronization signal HSYNC may be recognized as "1", and when the horizontal synchronization signal HSYNC has the low logic state at the rising time point of the clock signal Clk_a, the horizontal synchronization signal HSYNC may be recognized as "0".

The start time point of a first code period that first occurs among the m code periods CPa may be delayed by a reference setup time RSTa from a start time point of the vertical active period VAPa. As an example, the start time point of the first code period Cpa may be delayed by the reference setup time RSTa from the start time point of the vertical active period VAPa. The reference setup time RSTa may be set to about 100 ns or precisely 100 ns, but is not limited thereto.

Figure 16:
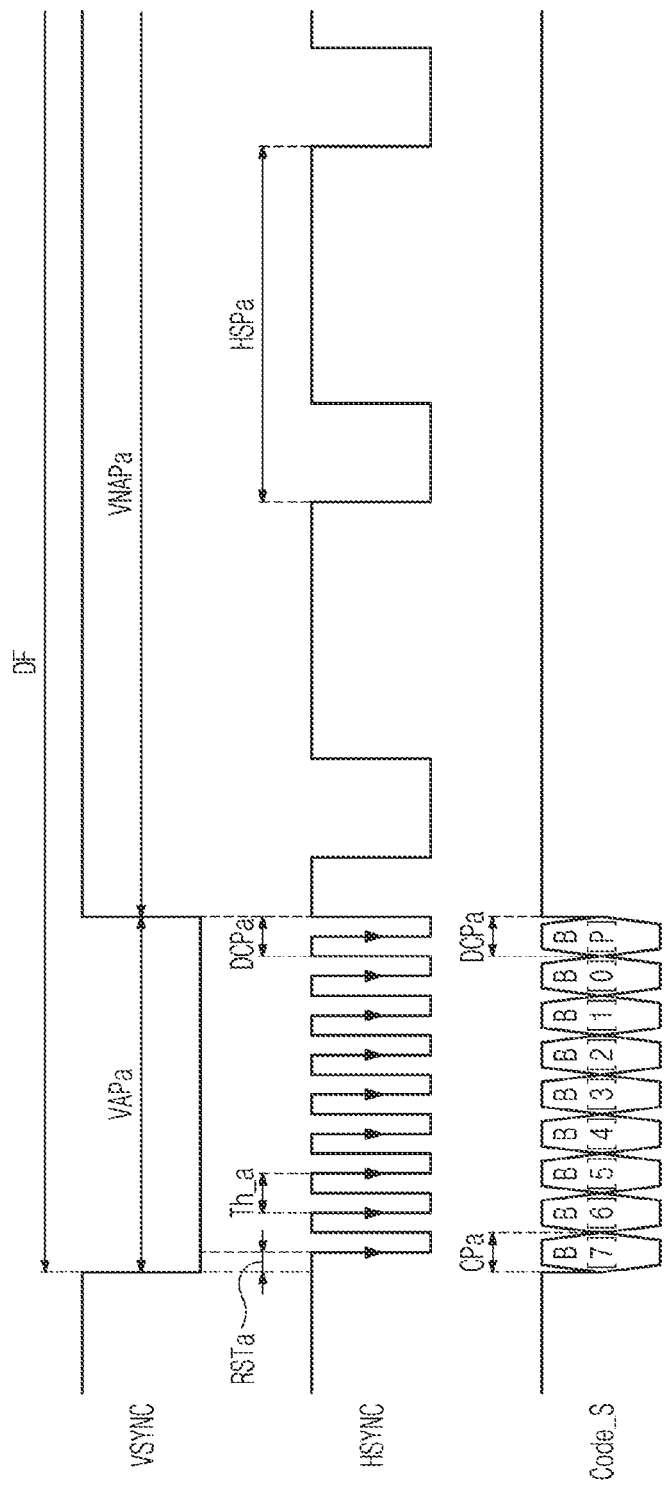
FIG. 16 is a waveform diagram of a vertical synchronization signal, a horizontal synchronization signal, and a code signal including code information according to an embodiment of the present disclosure.

FIG. 16 is a waveform diagram of a vertical synchronization signal, a horizontal synchronization signal, and a code signal including code information according to an embodiment of the present disclosure.

Referring to FIG. 16, the vertical synchronization signal VSYNC may include a vertical active period VAPa and a vertical non-active period VNAPa, which are located in a display frame DF. The vertical active period VAPa may have substantially the same duration as a duration of a horizontal scan period HSPa.

In an embodiment, the display controller 100C (refer to FIG. 2) embeds frequency information into the code signal Code_S in response to the vertical active period VAPa and may provide the embedded frequency information to the sensor controller 200C (refer to FIG. 2). The frequency information may be an M-bit signal, and the code signal Code_S may include m code periods Cpa located in the vertical active period VAPa. The "m" may be an integer equal to or greater than 1. When the frequency information is the M-bit signal, the frequency information may be expressed as $2^m$ driving frequencies. In an embodiment, the code signal Code_S is activated only in the vertical active period VAPa and is maintained in an inactive state in the vertical non-active period VNAPa. For example, the code signal Code_S may have a constant level in the vertical non-active period VNAPa.

The code signal Code_S may further include a dummy code period DCPa located in the vertical active period VAPa. The dummy code period DCPa may be used as a parity bit B[P] to check whether an error occurs in the frequency information. The dummy code period DCPa may have the same or substantially the same duration as a duration of each of the m code periods Cpa. In a case where one dummy code period DCPa is located in the vertical active period VAPa, the duration of each of the m code periods Cpa may be the same as 1/(m+1) times the duration of the horizontal scan period HSPa.

The sensor controller 200C (refer to FIG. 2) may determine whether the code signal Code_S has a high logic state or a low logic state in each of the m code periods CPa in response to the horizontal synchronization signal HSYNC. For example, the sensor controller 200C may determine whether the code signal Code_S has a high logic state or a low logic state at each falling edge of the horizontal synchronization signal HSYNC. The horizontal synchronization signal HSYNC may be activated with a cycle of a second reference period Th_a in the vertical active period VAPa. The second reference period Th_a may have a duration corresponding to each of the m code periods CPa. As an example, the second reference period Th_a may have the duration smaller than that of the horizontal scan period HSPa. The duration of the second reference period Th_a may be the same as 1/(m+1) times the duration of the horizontal scan period HSPa.

The sensor controller 200C may determine the state of the code signal Code_S at a falling time point of the horizontal synchronization signal HSYNC. When the code signal Code_S has the high logic state at the falling time point of the horizontal synchronization signal HSYNC, the code signal Code_S may be recognized as "1", and when the code signal Code_S has the low logic state at the falling time point of the horizontal synchronization signal HSYNC, the code signal Code_S may be recognized as "0".

A start time point of the second reference period Th_a may be delayed by a reference setup time RSTa from a start time point of the vertical active period VAPa. As an example, the reference setup time RSTa may be set to about 100 ns or precisely 100 ns, but is not be limited thereto.

Figure 17:
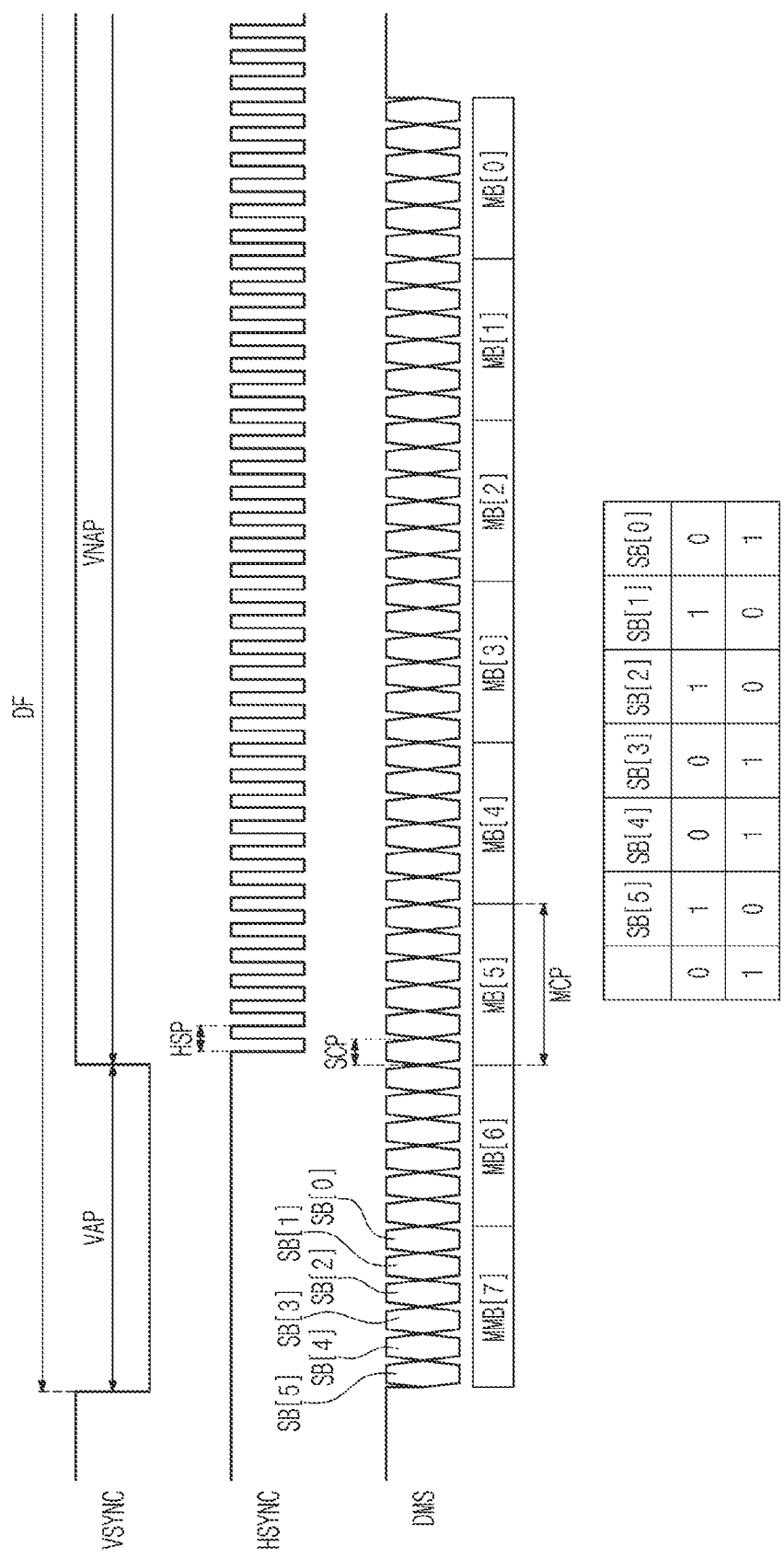
FIG. 17 is a waveform diagram of a vertical synchronization signal, a horizontal synchronization signal, and a direct spread modulation signal including code information according to an embodiment of the present disclosure.

FIG. 17 is a waveform diagram of a vertical synchronization signal, a horizontal synchronization signal, and a direct spread modulation signal including code information according to an embodiment of the present disclosure.

Referring to FIG. 17, the display controller 100C (refer to FIG. 2) may provide the vertical synchronization signal VSYNC, the horizontal synchronization signal HSYNC, and a direct spread modulation signal DMS to the sensor controller 200C (refer to FIG. 2). In an embodiment, the display controller 100C embeds frequency information into the direct spread modulation signal DMS and may provide the embedded frequency information to the sensor controller 200C.

In a case where the frequency information is an m×k-bit signal, the frequency information may include m main codes MB[7] to MB[0], and each of the m main codes MB[7] to MB[0] may include k sub-bits SB[5] to SB[0]. In the present embodiment, each of the "m" and "k" may be an integer equal to or greater than 1. In the embodiment shown in FIG. 17, the "m" is 8, and the "k" is 6, however, the present disclosure is not limited thereto. When the frequency information is the m×k-bit signal, the frequency information may be expressed as $2^m$ driving frequencies.

The direct spread modulation signal DMS may include m main code periods MCP. Each of the m main code periods MCP may include k sub-code periods SCP, and the driving frequency may be determined depending on whether the direct spread modulation signal DMS has a high logic state or a low logic state in each of the k sub-code periods SCP.

The vertical synchronization signal VSYNC may include a vertical active period VAP and a vertical non-active period VNAP, which are located in a display frame DF. Some of the m main code periods MCP may overlap the vertical active period VAP, and the other of the m main code periods MCP may overlap the vertical non-active period VNAP, however, the present disclosure is not limited thereto. In an alternate embodiment, the m main code periods MCP overlap the vertical active period VAP and do not overlap the vertical non-active period VNAP.

The sensor controller 200C may read the frequency information from the direct spread modulation signal DMS in response to the horizontal synchronization signal HSYNC. In an embodiment, the sensor controller 200C determines whether the direct spread modulation signal DMS has the high logic state or the low logic state in each of the k sub-code periods SCP in response to the horizontal synchronization signal HSYNC.

The horizontal synchronization signal HSYNC may be activated with a cycle of a horizontal scan period HSP in the vertical non-active period VNAP. As an example, the k sub-code periods SCP may have substantially the same duration as a duration of the horizontal scan period HSP.

The sensor controller 200C may determine the state of the direct spread modulation signal DMS at a falling time point or falling edge of the horizontal synchronization signal HSYNC. When the direct spread modulation signal DMS has the high logic state at the falling time point of the horizontal synchronization signal HSYNC, the direct spread modulation signal DMS may be recognized as "1", and when the direct spread modulation signal DMS has the low logic state at the falling time point of the horizontal synchronization signal HSYNC, the direct spread modulation signal DMS may be recognized as "0".

As an example, each of the main codes MB[7] to MB[0] may have a value of "0" or "1" based on the sub-bits SB[5] to SB[0]. As an example, when the sub-bits SB[5] to SB[0] have the value of "100110", the main code may have the value of "0", and when the sub-bits SB[5] to SB[0] have the value of "011001", the main code may have the value of "1".

As described above, in a case where the frequency information is expressed by a combination of the main codes MB[7] to MB[0] and the sub-bits SB[5] to SB[0], the frequency information may be transmitted more precisely. As an example, even though an error occurs in one or two bits of the sub-bits SB[5] to SB[0] due to signal interferences, the value of the main code may be inferred from the remaining sub-bits, and thus, defects in which the frequency information is incorrectly recognized may be reduced.

Although embodiments of the present disclosure have been described, it is understood that the present disclosure is not limited to these embodiments but various changes and modifications can be made by one ordinary skilled in the art within the spirit and scope of the present disclosure as hereinafter claimed. Therefore, the disclosed subject matter should not be limited to any single embodiment described herein.

What is claimed is:

1. A display device comprising:
a display panel which displays an image based on a display frame during a display frame period;
an input sensor disposed on the display panel to sense an input during a sensing frame period;
a display controller receiving a vertical synchronization signal and a horizontal synchronization signal and controlling driving of the display panel in response to the vertical synchronization signal and the horizontal synchronization signal; and
a sensor controller receiving at least one of the vertical synchronization signal and the horizontal synchronization signal and providing a transmission signal comprising a plurality of sampling periods to the input sensor,
wherein the display controller provides frequency information of the display frame period to the sensor controller using at least one of the vertical synchronization signal and the horizontal synchronization signal, and the sensor controller controls a number of the sampling periods of the sensing frame period based on the frequency information,
wherein the number of the sampling periods generated in a first sensing frame period corresponding to a display period of the display frame period, is greater than the number of the sampling periods generated in a second sensing frame period corresponding to a blank period of the display frame period.

2. The display device of claim 1, wherein the display period has a duration that does not vary according to a driving frequency of the display frame period, and the blank period has a duration that varies according to the driving frequency of the display frame period.

3. The display device of claim 1, wherein the vertical synchronization signal comprises a vertical active period located in the display frame period, the horizontal synchronization signal comprises a horizontal active period located in the vertical active period, and the display controller varies at least one of a first duration of the vertical active period and a second duration of the horizontal active period according to a driving frequency of the display frame period and provides the frequency information of the display frame period to the sensor controller.

4. The display device of claim 3, wherein the frequency information is implemented by a combination of the first duration of the vertical active period and the second duration of the horizontal active period.

5. The display device of claim 4, wherein the horizontal synchronization signal is activated in response to one horizontal scan period, the first duration of the vertical active period is set to n times the horizontal scan period, and the n is an integer equal to or greater than 1.

6. The display device of claim 5, wherein the horizontal active period has a start time point delayed by a reference setup time from a start time point of the vertical active period.

7. The display device of claim 1, wherein the vertical synchronization signal comprises a vertical active period and a vertical non-active period, which occur in the display frame period, the display controller embeds the frequency information into the horizontal synchronization signal in response to the vertical active period and provides the embedded frequency information to the sensor controller, and the horizontal synchronization signal is activated in response to one horizontal scan period in the vertical non-active period.

8. The display device of claim 7, wherein the frequency information is an M-bit signal, the horizontal synchronization signal comprises m code periods occurring in the vertical active period, the frequency information is determined depending on whether the horizontal synchronization signal has a high logic state or a low logic state in each of the m code periods, and the m is an integer equal to or greater than 1.

9. The display device of claim 8, wherein the horizontal synchronization signal further comprises a dummy code period occurring in the vertical active period, and a value of the horizontal synchronization signal in the dummy code period represents a parity bit used to check whether an error occurs in the frequency information.

10. The display device of claim 8, wherein the sensor controller determines whether the horizontal synchronization signal has the high logic state or the low logic state in each of the m code periods in response to a clock signal, and the clock signal has a cycle corresponding to each of the m code periods.

11. The display device of claim 8, wherein a start time point of the code period that first occurs among the m code periods is delayed by a reference setup time from a start time point of the vertical active period.

12. The display device of claim 7, wherein the vertical active period has a duration corresponding to n times the horizontal scan period, and the n is an integer equal to or greater than 1.

13. The display device of claim 1,
wherein the vertical synchronization signal comprises a vertical active period and a vertical non-active period, which occur in the display frame period, the display controller embeds the frequency information into a code signal in response to the vertical active period and provides the embedded frequency information to the sensor controller, and the code signal maintains an inactive state in the vertical non-active period.

14. The display device of claim 13, wherein the frequency information is an M-bit signal, the code signal comprises m code periods located in the vertical active period, the frequency information is determined depending on whether the code signal has a high logic state or a low logic state in each of the m code periods, and the m is an integer equal to or greater than 1.

15. The display device of claim 13, wherein the code signal further comprises a dummy code period occurring in the vertical active period, and a value of the code signal in the dummy code period represents a parity bit used to check whether an error occurs in the frequency information.

16. The display device of claim 14, wherein the horizontal synchronization signal is activated with a cycle of a reference period in the vertical active period, and the sensor controller determines whether the code signal has the high logic state or the low logic state in each of the m code periods in response to the horizontal synchronization signal.

17. The display device of claim 16, wherein the horizontal synchronization signal is activated with a cycle of a horizontal scan period in the vertical non-active period, and the reference period and each of the m code periods have a same duration as the horizontal scan period.

18. The display device of claim 16, wherein the horizontal synchronization signal is activated with a cycle of a horizontal scan period in the vertical non-active period, and the reference period and each of the m code periods is equal to or smaller than 1/m times the horizontal scan period.

19. The display device of claim 16, wherein a start time point of the reference period is delayed by a reference setup time from a start time point of the vertical active period.

20. The display device of claim 16, wherein the vertical active period has a duration corresponding to n times a horizontal scan period, and the n is an integer equal to or greater than 1.

21. The display device of claim 1, wherein the display controller embeds the frequency information into a direct spread modulation signal and provides the direct spread modulation signal embedded with the frequency information to the sensor controller, and the sensor controller reads the frequency information from the direct spread modulation signal in response to the horizontal synchronization signal.

22. The display device of claim 21, wherein the frequency information is an M-bit signal, the direct spread modulation signal comprises m main code periods, each of the m main code periods comprises k sub-code periods, the frequency information is determined depending on whether the direct spread modulation signal has a high logic state or a low logic state in each of the k sub-code periods, and each of the m and k is an integer equal to or greater than 1.

23. The display device of claim 22, wherein the sensor controller determines whether the direct spread modulation signal has the high logic state or the low logic state in response to the horizontal synchronization signal in each of the k sub-code periods, and the horizontal synchronization signal has a cycle corresponding to each of the k sub-code periods.

24. An electronic device comprising:
a display panel which displays an image based on a display period during a display frame period;
an input sensor disposed on the display panel to sense an input during a sensing frame period;
a display controller receiving a synchronization signal and controlling driving of the display panel using the synchronization signal;
a sensor controller providing a transmission signal comprising a plurality of sampling periods to the input sensor; and
a main controller controlling the display controller and the sensor controller,
wherein the display controller embeds frequency information of the display frame period into the synchronization signal to generate an embedded signal and provides the embedded signal to the sensor controller, and
wherein the sensor controller extracts the frequency information from the embedded signal and adjusts a number of the sampling periods based on the extracted frequency information,
wherein the number of the sampling periods generated in a first sensing frame period corresponding to a display period of the display frame period, is greater than the number of the sampling periods generated in a second sensing frame period corresponding to a blank period of the display frame period.

25. The electronic device of claim 24, wherein the synchronization signal is one of a vertical synchronization signal and a horizontal synchronization signal.

* * * * *